US008799830B2

(12) United States Patent
Robles

(10) Patent No.: US 8,799,830 B2
(45) Date of Patent: Aug. 5, 2014

(54) INTEGRATED CIRCUIT LAYOUT DESIGN METHODOLOGY WITH PROCESS VARIATION BANDS

(75) Inventor: Juan Andres Torres Robles, Wilsonville, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 1154 days.

(21) Appl. No.: 11/123,340

(22) Filed: May 6, 2005

(65) Prior Publication Data

US 2005/0251771 A1   Nov. 10, 2005

Related U.S. Application Data

(60) Provisional application No. 60/655,837, filed on Feb. 23, 2005, provisional application No. 60/568,849, filed on May 7, 2004.

(51) Int. Cl.
*G06F 17/50* (2006.01)
*G06F 9/455* (2006.01)
*G06F 11/22* (2006.01)

(52) U.S. Cl.
USPC .............................. 716/51; 716/111; 716/136

(58) Field of Classification Search
USPC .................................. 716/2, 5, 51, 111, 136
See application file for complete search history.

(56) References Cited

U.S. PATENT DOCUMENTS

| 4,532,650 A | 7/1985 | Wihl et al. |
| 4,762,396 A | 8/1988 | Dumant et al. |
| 5,396,584 A | 3/1995 | Lee et al. |
| 5,502,654 A | 3/1996 | Sawahata |
| 5,558,963 A | 9/1996 | Tsudaka et al. |
| 5,655,110 A | 8/1997 | Krivokapic et al. |
| 5,723,233 A | 3/1998 | Garza et al. |
| 5,723,235 A | 3/1998 | Tsudaka et al. |
| 5,815,685 A | 9/1998 | Kamon |
| 5,825,647 A | 10/1998 | Tsudaka |
| 5,879,844 A | 3/1999 | Yamamoto et al. |
| 5,991,006 A | 11/1999 | Tsudaka |
| 6,016,357 A | 1/2000 | Neary et al. |
| 6,033,814 A | 3/2000 | Burdorf et al. |

(Continued)

FOREIGN PATENT DOCUMENTS

| JP | 04344979 | 12/1992 |
| JP | 07-175204 | 7/1995 |

(Continued)

OTHER PUBLICATIONS

Rieger, M.L., "Anticipating and Controlling Mask Costs Within EDA Physical Design," *Proceedings of SPIE* 5130:617-627, 2003.

(Continued)

*Primary Examiner* — Suresh Memula
(74) *Attorney, Agent, or Firm* — Klarquist Sparkman, LLP

(57) ABSTRACT

A system for analyzing IC layouts and designs by calculating variations of a number of objects to be created on a semiconductor wafer as a result of different process conditions. The variations are analyzed to determine individual feature failures or to rank layout designs by their susceptibility to process variations. In one embodiment, the variations are represented by PV-bands having an inner edge that defines the smallest area in which an object will always print and an outer edge that defines the largest area in which an object will print under some process conditions.

39 Claims, 25 Drawing Sheets

Enhanced design flow using the methodology proposed in this work.

(56) References Cited

U.S. PATENT DOCUMENTS

| | | |
|---|---|---|
| 6,042,257 A | 3/2000 | Tsudaka |
| 6,049,660 A | 4/2000 | Ahn et al. |
| 6,077,310 A | 6/2000 | Yamamoto et al. |
| 6,080,527 A | 6/2000 | Huang et al. |
| 6,120,952 A | 9/2000 | Pierrat et al. |
| 6,128,067 A | 10/2000 | Hashimoto |
| 6,187,483 B1 | 2/2001 | Capodieci et al. |
| 6,226,781 B1 | 5/2001 | Nistler et al. |
| 6,238,824 B1 | 5/2001 | Futrell et al. |
| 6,243,855 B1 | 6/2001 | Kobayashi et al. |
| 6,249,904 B1 | 6/2001 | Cobb |
| 6,263,299 B1 | 7/2001 | Aleshin et al. |
| 6,269,472 B1 | 7/2001 | Garza et al. |
| 6,301,697 B1 | 10/2001 | Cobb |
| 6,317,859 B1 | 11/2001 | Papadopoulou |
| 6,415,421 B2 | 7/2002 | Anderson et al. |
| 6,425,113 B1 | 7/2002 | Anderson et al. |
| 6,430,737 B1 | 8/2002 | Cobb et al. |
| 6,453,457 B1 | 9/2002 | Pierrat et al. |
| 6,467,076 B1 | 10/2002 | Cobb |
| 6,470,489 B1 | 10/2002 | Chang et al. |
| 6,487,503 B2 | 11/2002 | Inui |
| 6,499,003 B2 | 12/2002 | Jones et al. |
| 6,574,784 B1 | 6/2003 | Lippincott et al. |
| 6,643,616 B1 | 11/2003 | Granik et al. |
| 6,649,309 B2 | 11/2003 | Mukherjee |
| 6,665,856 B1 | 12/2003 | Pierrat et al. |
| 6,668,367 B2 | 12/2003 | Cobb et al. |
| 6,718,526 B1 | 4/2004 | Eldredge et al. |
| 6,748,578 B2 | 6/2004 | Cobb |
| 6,778,695 B1 | 8/2004 | Schellenberg et al. |
| 6,792,590 B1 | 9/2004 | Pierrat et al. |
| 6,815,129 B1 | 11/2004 | Bjorkholm et al. |
| 6,817,003 B2 | 11/2004 | Lippincott et al. |
| 6,857,109 B2 | 2/2005 | Lippincott |
| 6,862,726 B2 | 3/2005 | Futatsuya et al. |
| 6,887,633 B2 | 5/2005 | Tang |
| 6,928,634 B2 | 8/2005 | Granik et al. |
| 6,973,633 B2 | 12/2005 | Lippincott et al. |
| 6,989,229 B2 | 1/2006 | Lucas et al. |
| 7,010,776 B2 | 3/2006 | Gallatin et al. |
| 7,013,439 B2 | 3/2006 | Robles et al. |
| 7,017,141 B2 | 3/2006 | Anderson et al. |
| 7,024,655 B2 | 4/2006 | Cobb |
| 7,028,284 B2 | 4/2006 | Cobb et al. |
| 7,047,516 B2 | 5/2006 | Futatsuya |
| 7,073,162 B2 | 7/2006 | Cobb et al. |
| 7,155,689 B2 | 12/2006 | Pierrat et al. |
| 7,155,699 B2 | 12/2006 | Cobb |
| 7,172,838 B2 | 2/2007 | Maurer et al. |
| 7,181,721 B2 | 2/2007 | Lippincott et al. |
| 7,194,725 B1 | 3/2007 | Lukanc et al. |
| 7,237,221 B2 | 6/2007 | Granik et al. |
| 7,240,305 B2 | 7/2007 | Lippincott |
| 7,240,321 B2 | 7/2007 | Cobb et al. |
| 7,281,234 B2 | 10/2007 | Lippincott |
| 7,293,249 B2 | 11/2007 | Robles et al. |
| 7,324,930 B2 | 1/2008 | Cobb |
| 7,367,009 B2 | 4/2008 | Cobb et al. |
| 7,378,202 B2 | 5/2008 | Granik et al. |
| 7,392,168 B2 | 6/2008 | Granik et al. |
| 7,418,124 B2 | 8/2008 | Peterson |
| 7,487,490 B2 | 2/2009 | Zhang |
| 7,506,301 B2 | 3/2009 | Kotani et al. |
| 7,523,429 B2 | 4/2009 | Kroyan |
| 7,739,650 B2 | 6/2010 | Robles et al. |
| 8,056,022 B2 | 11/2011 | Robles et al. |
| 8,185,847 B2 | 5/2012 | Robles et al. |
| 8,504,959 B2 | 8/2013 | Robles et al. |
| 8,555,212 B2 | 10/2013 | Sawicki et al. |
| 2001/0018759 A1 | 8/2001 | Andreev et al. |
| 2001/0049811 A1 | 12/2001 | Taoka |
| 2002/0026626 A1 | 2/2002 | Randall et al. |
| 2002/0094680 A1 | 7/2002 | Lin |
| 2003/0037309 A1 | 2/2003 | Utsunomiya |
| 2003/0134205 A1 | 7/2003 | Yu |
| 2003/0208728 A1 | 11/2003 | Pierrat |
| 2004/0064797 A1 | 4/2004 | Li |
| 2004/0128118 A1* | 7/2004 | Croffie et al. .................. 703/14 |
| 2004/0268282 A1 | 12/2004 | Rittman et al. |
| 2005/0015740 A1 | 1/2005 | Sawicki et al. |
| 2005/0022150 A1 | 1/2005 | Liu et al. |
| 2005/0050490 A1 | 3/2005 | Futatsuya et al. |
| 2005/0149901 A1 | 7/2005 | Tang |
| 2005/0177810 A1* | 8/2005 | Heng et al. .................. 716/21 |
| 2005/0229125 A1* | 10/2005 | Tabery et al. .................. 716/5 |
| 2005/0234684 A1 | 10/2005 | Sawicki et al. |
| 2005/0278686 A1 | 12/2005 | Word et al. |
| 2006/0005154 A1 | 1/2006 | Cobb et al. |
| 2006/0062445 A1 | 3/2006 | Verma et al. |
| 2006/0069958 A1 | 3/2006 | Sawicki et al. |
| 2006/0074611 A1 | 4/2006 | Wong et al. |
| 2006/0090148 A1 | 4/2006 | Zhu et al. |
| 2006/0188796 A1 | 8/2006 | Word |
| 2006/0190875 A1 | 8/2006 | Arisawa et al. |
| 2006/0199084 A1 | 9/2006 | Word |
| 2006/0200790 A1 | 9/2006 | Shang et al. |
| 2006/0240342 A1 | 10/2006 | Tang |
| 2007/0006118 A1 | 1/2007 | Pierrat et al. |
| 2007/0074143 A1 | 3/2007 | Cobb et al. |
| 2007/0118826 A1 | 5/2007 | Lippincott |
| 2007/0124708 A1 | 5/2007 | Robles et al. |
| 2007/0204242 A1 | 8/2007 | Brunet et al. |
| 2007/0204256 A1 | 8/2007 | Brunet et al. |
| 2007/0240086 A1 | 10/2007 | Sinha et al. |
| 2008/0141195 A1 | 6/2008 | Robles et al. |
| 2008/0148217 A1 | 6/2008 | Park |
| 2008/0166639 A1 | 7/2008 | Park et al. |
| 2008/0195996 A1 | 8/2008 | Robles et al. |
| 2008/0256500 A1 | 10/2008 | Cobb et al. |
| 2009/0132980 A1 | 5/2009 | Sinha et al. |
| 2009/0178018 A1 | 7/2009 | Robles et al. |
| 2009/0186429 A1 | 7/2009 | Kotani et al. |
| 2014/0040850 A1 | 2/2014 | Sawicki et al. |

FOREIGN PATENT DOCUMENTS

| | | |
|---|---|---|
| JP | 09319067 | 12/1997 |
| JP | 2001-350250 | 12/2001 |
| JP | 2002-131882 | 5/2002 |
| JP | 2004-502961 | 1/2004 |
| WO | WO 99/14637 | 3/1999 |
| WO | WO 99/14638 | 3/1999 |
| WO | WO 99/14638 A1 | 3/1999 |
| WO | WO 01/65315 | 7/2001 |
| WO | WO 2005/111874 | 11/2005 |

OTHER PUBLICATIONS

Adam et al., "Improved Modeling Performance with an Adapted Vectorial Formulation of the Hopkins imaging Equation," *Proceedings of SPIE: Optical Microlithography XVI*, vol. 5040, pp. 78-91 (Feb. 25, 2003).

Bailey et al., "Intensive 2D SEM Model Calibration for 45nm and Beyond," *Proceedings of SPIE*, vol. 6154, 10 pp. (Feb. 21, 2006).

Brist et al., "Illumination Optimization Effects on OPC and MDP," *Proceedings of SPIE*, vol. 5754, pp. 1179-1189 (Mar. 1, 2005).

Brist et al., "Source Polarization and OPC Effects on Illumination Optimization," *Proceedings of SPIE, 25th Annual BACUS Symposium on Photomask Technology*, vol. 5992, pp. 599232-1/9 (Oct. 3, 2005).

Cao et al., "Standard Cell Characterization Considering Lithography Induced Variations," *Design Automation Conference, 43rd ACM/IEEE*, pp. 801-804 (Jul. 24-28, 2006).

Chen et al., "An Automated and Fast OPC Algorithm for OPC-Aware Layout Design," *Int'l Symp. on Quality Electronic Design*, pp. 782-787 (Mar. 26-28, 2007).

Cobb, "Flexible Sparse and Dense OPC Algorithms," *Proceedings of SPIE, Photomask and Next-Generation Lithography Mask Technology XII*, vol. 5853, pp. 693-702 (Apr. 13, 2005).

Cobb et al., "Model-Based OPC Using the MEEF Matrix," *Proceedings of SPIE, 22nd Annual BACUS Symposium on Photomask Tech-

(56) References Cited

OTHER PUBLICATIONS nology, vol. 4889, 10 pp. (Sep. 30-Oct. 4, 2002).
Cobb et al., "Large Area Phase-Shift Mask Design," *Proceedings of SPIE, Symposium on Optical/Laser Microlithography VII*, vol. 2197, pp. 348-360 (Mar. 2-4, 1994).
Cobb et al., "Using OPC to Optimize for Image Slope and Improve Process Window," *Proceeding of SPIE, Photomask Japan*, vol. 5130, pp. 838-846 (Apr. 16-18, 2003).
Cobb et al., "OPC Methods to Improve Image Slope and Process Window," *Proceedings of SPIE: Design and Process Integration for Microelectronic Manufacturing*, vol. 5042, pp. 116-125 (Feb. 27, 2003).
Cobb et al., "Experimental Results on Optical Proximity Correction With Variable Threshold Resist Model,"*Proceedings of SPIE: Symposium on Optical Microlithography X*, vol. 3051, pp. 458-468 (Mar. 10-14, 1997).
Cobb et al., "Fast Sparse Aerial Image Calculation for OPC," *Proceedings of SPIE: 15th Annual BACUS Symposium on Photomask Technology and Management*, vol. 2621, pp. 534-545 (Sep. 20-22, 1995).
Cobb et al., "Fast, Low-Complexity Mask Design," *Proceedings of SPIE: Symposium on Optical/Laser Microlithography VIII*, vol. 2440, pp. 313-327 (Feb. 22-24, 1995).
Cobb et al., "Mathematical and CAD Framework for Proximity Correction," *Proceedings of SPIE: Symposium on Optical Microlithography IX*, vol. 2726, pp. 208-222 (Mar. 13-15, 1996).
Cobb et al., "New Concepts in OPC," *Proceedings of SPIE: Optical Microlithography XVII*, vol. 5377, pp. 680-690 (Feb. 24, 2004).
Dammel, "Photoresist for microlithography, or the Red Queen's race," *J. Microlithogr. Microfabrication Microsyst.*, vol. 1, pp. 270-275 (Oct. 2002).
Drapeau et al., "Double patterning design split implementation and validation for the 32nm node," *Proc. SPIE*, vol. 6521, pp. 652109-1 through 652109-15 (2007).
Granik, "Generalized MEEF Theory," *Interface 2001*, 13 pp. (Nov. 2001).
Granik, "New Process Models for OPC at sub-90nm Nodes," *Proceedings of SPIE: Optical Microlithography XVI*, vol. 5040, pp. 1166-1175 (Feb. 25, 2003).
Granik, "Solving Inverse Problems of Optical Microlithography," *Proceedings of SPIE: Optical Microlithography XVIII*, vol. 5754, pp. 506-526 (Mar. 1, 2005).
Granik et al., "MEEF as a Matrix," *Proceedings of SPIE: 21st Annual BACUS Symposium on Photomask Technology*, vol. 4562, pp. 980-991 (Oct. 2-5, 2001).
Granik et al., "Two-Dimensional G-MEEF Theory and Applications," *Proceedings of SPIE: Symposium on Photomask and Next-Generation Lithography Mask Technology IX*, vol. 4754, pp. 146-155 (Apr. 23-25, 2002).
Granik et al., "Universal process modeling with VTRE for OPC," *Proceedings of SPIE: Optical Microlithography XV*, vol. 4691, pp. 377-394 (Mar. 5, 2002).
Gupta et al., "Manufacturing-Aware Physical Design," *Computer Aided Design*, pp. 681-687 (Nov. 9-13, 2003).
Hajj, Intel's AMT enables rapid processing and info-turn for Intel's DFM test chip vehicle, *Proc. SPIE*, vol. 6730, pp. 67300Q-1 through 67300Q-13 (2007).
Hong et al., "Impact of Process Variance on 65 nm Across-Chip Linewidth Variation," *Proceedings of SPIE: Design and Process Integration for Microelectronic Manufacturing IV*, vol. 6156, pp. 61560Q1-9 (Feb. 23, 2006).
Hoppe et al., "Beyond rule-based physical verification," *Proc. SPIE*, vol. 6349, pp. 63494X.-1 through 63494X-9 (2006).
International Search Report, International Application No. PCT/US2005/016115, International Filing Date Jun. 5, 2005.
Li et al., "Transferring Optical Proximity Correction (OPC) Effect into Optical Mode," *Int'l Symp. on Quality Electronic Design*, pp. 771-775 (Mar. 26-28, 2007).

Liebmann, "Layout Impact of Resolution Enhancement Techniques: Impediment or Opportunity?" *Proceedings of the 2003 International Symposium on Physical Design*, pp. 110-117 (Apr. 6-9, 2003).
Lucas et al., "Reticle Enhancement Verification for 65 nm and 45 nm Nodes," *Proceedings of SPIE: Design and Process Integration for Microelectronic Manufacturing IV*, vol. 6156, pp. 61560Q1-9 (Feb. 23, 2006).
Luk-Pat et al., "Correcting Lithography Hot Spots during Physical-Design Implementation," *Proceedings of SPIE: Photomask Technology 2006*, vol. 6349, p. 634920-1 through 634920-9 (Sep. 19, 2006).
Maurer et al., "Evaluation of a Fast and Flexible OPC Package: OPTISSIMO," *Proceedings of SPIE: 16th Annual Symposium on Photomask Technology and Management*, vol. 2884, pp. 412-418 (Sep. 18-20, 1996).
Maurer et al., "Process Proximity Correction Using an Automated Software Tool," *Proceedings of SPIE: Optical Microlithography XI*, vol. 3334, pp. 245-253 (Feb. 22-27, 1998).
Mentor Graphics Corporation, News and Views, "DSM Verification and Analysis," including a partial translation, 7 pp. (document marked Mar. 1999).
Mentor Graphics Corporation, News and Views, "OPC," including a partial translation, 11 pp. (document marked Mar. 1999).
Mentor Graphics Corporation, News and Views, "Calibre," including a partial translation, 9 pp. (document marked Apr. 2000).
Ohnuma et al., "Lithography Computer Aided Design Technology for Embedded Memory in Logic," *Japanese Journal of Applied Physics*, vol. 37(12B), pp. 6686-6688 (Dec. 1998).
Pack et al., "Physical and Timing Verification of Subwavelength-Scale Designs—Part I: Lithography Impact on MOSFETs," *Proceedings of SPIE: Design and Process Integration for Microelectronic Manufacturing*, vol. 5042, pp. 51-62 (Feb. 27, 2003).
Pan, "Lithography-Aware Physical Design," *ASIC*, pp. 35-36 (Oct. 24-27, 2005).
Perry et al., "Model-based approach for design verification and co-optimization of catastrophic and parametric-related defects due to systematic manufacturing variations," *Proc. SPIE*, vol. 6521, pp. 65210E-1 through 65210E-10 (2007).
Philipsen et al., "Printability of Hard and Soft Defects in 193-nm Lithography," *Proceedings of SPIE: 18th European Conference on Mask Technology for Integrated Circuits and Microcomponents*, vol. 4764, pp. 95-112 (Jan. 15, 2002).
Pikus et al., "Non-uniform Yield Optimization for Integrated Circuit Layout," *Proceedings of SPIE: Photomask Technology*, vol. 6730, pp. 67300Y-1 through 67300Y-12 (Sep. 18, 2007).
Rieger et al., "Anticipating and Controlling Mask Costs within EDA Physical Design," *Proceedings of SPIE: Photomask and Next-Generation Lithography Mask Technology X*, vol. 5130, pp. 617-627 (Apr. 16, 2003).
Schacht et al., "Calibration of OPC Models for Multiple Focus Conditions," *Proceedings of SPIE: Optical Microlithography XVII*, vol. 5377, pp. 691-703 (Feb. 24, 2004).
Scheffer, "Physical CAD Changes to Incorporate Design for Lithography and Manufacturability," *Proceedings of the 2004 Conference on Asia South Pacific Design Automation*, pp. 768-773 (Jan. 27-30, 2004).
Schellenberg, "Sub-Wavelength Lithography Using OPC," *Semiconductor Fabtech*, 9th ed., pp. 205-209 (Mar. 1999).
Sturtevant et al., "Assessing the Impact of Real World Manufacturing Lithography Variations on Post-OPC CD Control," *Proceedings of SPIE: Design and Process Integration for Microelectronic Manufacturing III*, vol. 5756, pp. 240-254 (Mar. 4, 2005).
Sturtevant et al., "Considerations for the Use of Defocus Models for OPC," *Proceedings of SPIE: Design and Process Integration for Microelectronic Manufacturing III*, vol. 5756, pp. 427-436 (Mar. 4, 2005).
Tawfic et al., "Feedback Flow to Improve Model-Based OPC Calibration Test Pattern," *Proceedings of SPIE: Design for Manufacturability through Design-Process Integration*, vol. 6521, pp. 65211J-1 through 65211J-9 (Feb. 28, 2007).
Torres et al., "Contrast-Based Assist Feature Optimization," *Proceedings of SPIE: Optical Microlithography XV*, vol. 4691, pp. 179-187 (Mar. 5, 2002).

(56) References Cited

OTHER PUBLICATIONS

Torres et al., "Design Verification Flow for Model-Assisted Double Dipole Decomposition," *Proceedings of SPIE: Optical Microlithography XV*, vol. 4691, pp. 585-592 (Mar. 5, 2002).

Torres, "Fast LFD: Description, Availability and Considerations," Mentor User's Meeting at SPIE Advanced Lithography, 27 pp. (Feb. 26, 2007).

Torres et al., "Integrated Circuit DFM Framework for Deep Sub-Wavelength Processes," *Proceedings of SPIE: Design and Process Integration for Microelectronic Manufacturing III*, vol. 5756, pp. 39-50 (Mar. 4, 2005).

Torres, "Integrated Circuit Layout Design Methodology for Deep Sub-Wavelength Processes," Ph.D. Thesis, Oregon Health and Science University, 68 pp. (Mar. 2005).

Torres et al., "Layout verification in the era of process uncertainty: Requirements for Speed, Accuracy and Process Portability," *BACUS Photomask*, 20 pp. (Sep. 20, 2007).

Torres et al., "Layout verification in the era of process uncertainty: Requirements for Speed, Accuracy, and Process Portability," *Proc. SPIE*, vol. 6730, pp. 67300U-1 through 67300U-9 (published online Oct. 30, 2007).

Torres, "Layout verification in the era of process uncertainty: Target Process Variability Bands Vs Actual Process Variability Bands," *Proc. SPIE*, vol. 6925, pp. 692509-1 through 692509-8 (published online Mar. 4, 2008).

Torres et al., "Model Assisted Double Dipole Decomposition," *Proceedings of SPIE: Optical Microlithography XV*, vol. 4691, pp. 407-417 (Mar. 5, 2002).

Torres et al., "Process Window Modeling Using Compact Models," *Proceedings of SPIE: 24th Annual BACUS Symposium on Photomask Technology*, vol. 5567, pp. 638-648 (Sep. 14, 2004).

Torres et al. "RET-Compliant Cell Generation for Sub-130 nm Processes," *Proceedings of SPIE: Optical MicrolithographyXV*, vol. 4691, pp. 529-539 (Mar. 5, 2002).

Torres, "Towards Manufacturability Closure: Process Variations and Layout Design," *Electronic Design Process Symposium*, 7 pp. (Apr. 7-8, 2005).

Torres et al., "Unified Process Aware System for Circuit Layout Verification," *Proceedings of SPIE: Design for Manufacturability through Design-Process Integration*, vol. 6521, pp. 652108-1 through 652108-12 (Feb. 28, 2007).

Tsai et al., "Modeling Litho-Constrained Design Layout," *Design Automation Conference*, pp. 354-357 (Jun. 4-8, 2007).

Vasek et al., "SEM-Contour Based Mask Modeling," *Proceedings of SPIE: Optical Lithography XXI*, vol. 6924, pp. 69244Q-1 through 69244Q-11 (Feb. 26, 2008).

Vasek et al., "SEM-Contour-based OPC Model Calibration through the Process Window," *Proceedings of SPIE: Metrology, Inspection, and Process Control for Microlithography XXI*, pp. 65180D-1 through 65180D-10 (Feb. 26, 2007).

Word et al. "Advanced Layout Fragmentation and Simulation Schemes for Model Based OPC," *Proceedings of SPIE: Optical Microlithography XVIII*, vol. 5754, pp. 1159-1168 (Mar. 1, 2005).

Word et al., "Lithography Yield Enhancement through Optical Rule Checking," *Proceedings of SPIE: Advanced Microlithography Technologies*, vol. 5645, pp. 142-153 (Nov. 8, 2004).

Written Opinion, International Application No. PCT/US2005/016115, International Filing Date Jun. 5, 2005.

Yehia et al., Simultaneous Model-Based Main Feature and SRAF Optimization for 2D SRAF Implementation to 32 nm Critical Layers, *Proceedings of SPIE: Photomask Technology*, vol. 6730, pp. 67302K-1 through 67302K-10 (Sep. 18, 2007).

Yenikaya et al., "A rigorous method to determine printability of a target layout," *Proc. SPIE*, vol. 6521, pp. 652112-1 through 652112-12 (2007).

Notice of Reasons for Rejection, Japan Patent Application No. 2007-511692, May 24, 2010, 7 pages (with English translation).

Final Judgment, *Dr. Ajay Singhal* v. *Mentor Graphics Corp.*, Case No. 3:07-cv-01587-JL (N.D. Cal. Sep. 22, 2008), 2 pages.

Judgment Affirmed, *Dr. Ajay Singhal* v. *Mentor Graphics Corp.*, Case No. 2009-1057 (Fed. Cir. Jun. 12, 2009) (judgment entered into N.D. Cal Case No. 3:07-cv-01587-JL docket on Jun. 22, 2009), 7 pages.

Order Dismissing Petition for a Writ of Mandamus for Lack of Jurisdiction, Case No. 3:07-cv-01587-JL (9th Cir. Sep. 10, 2008), 1 page.

Order Dismissing Proceeding, *Dr. Ajay Singhal* v. *Mentor Graphics Corp.*, 310 Fed. Appx. 379 (Fed. Cir. 2008), 2 pages.

Opinion Affirming District Court's Grant of Partial Summary Judgment and Final Judgment Dismissing Case, *Dr. Ajay Singhal* v. *Mentor Graphics Corp.*, 328 Fed. Appx. 648, 2009 WL 1220786 (Fed. Cir. May 6, 2009), 3 pages.

Letter Regarding Related Litigation Information, filed by Applicants Mar. 6, 2014, and 76 documents cited therein, 7 pages.

\* cited by examiner

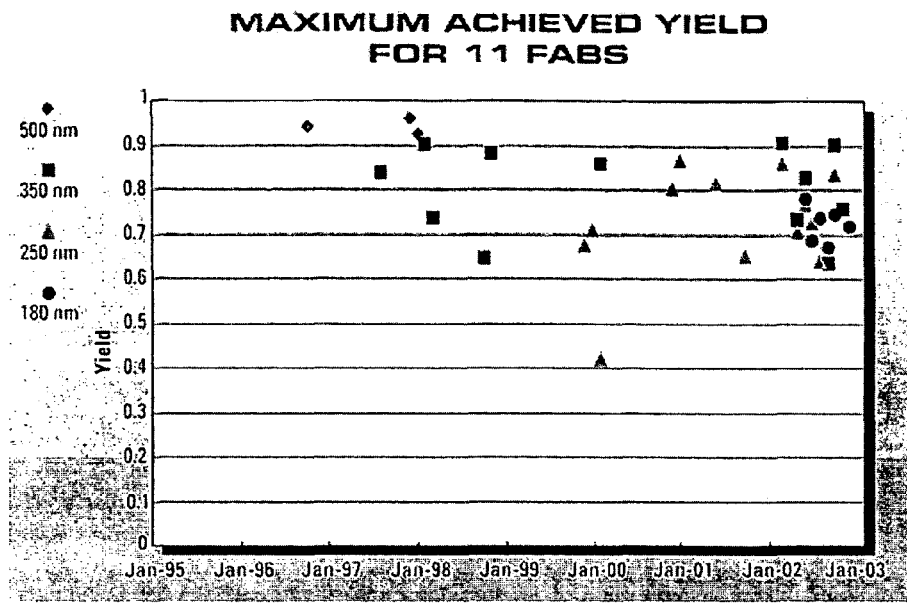
Figure 1. Maximum attainable yield for 500 nm, 350 nm, 250 nm and 180 nm processes.
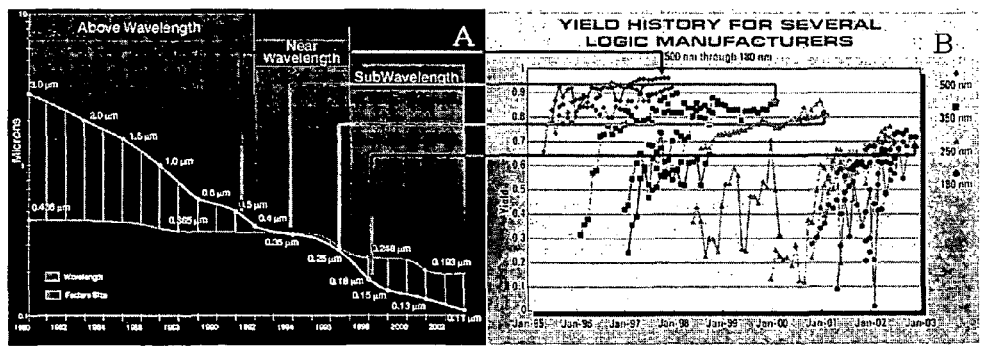
Figure 2. Sub-wavelength gap and its correlation to maximum attainable yield.

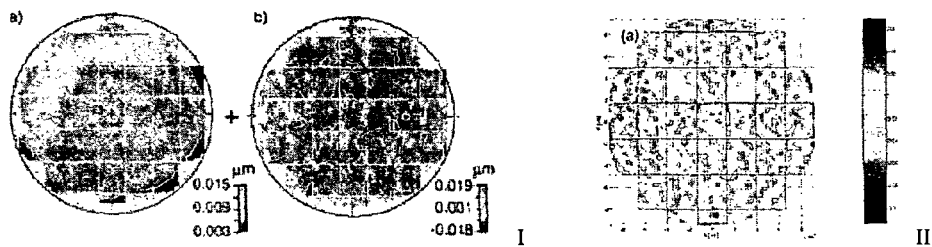
Figure 3. Mean defocus: Wafer component (Ia), field-by-field defocus residuals (removing systematic wafer component) (Ib) and field-by-field residuals (II).
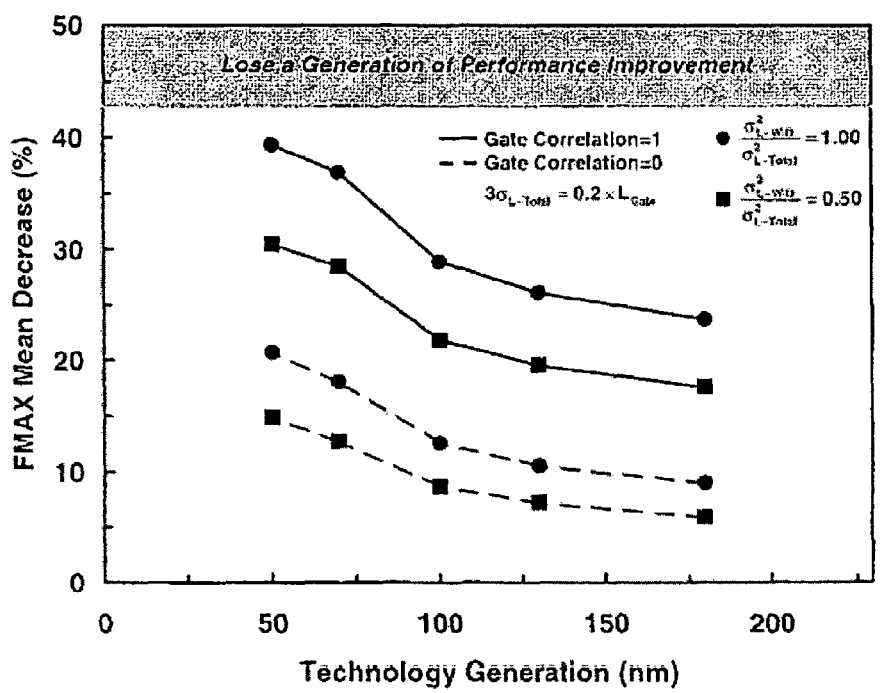
Figure 4. Reduction in maximum frequency resulting from within-die parameter fluctuations versus technology generation.

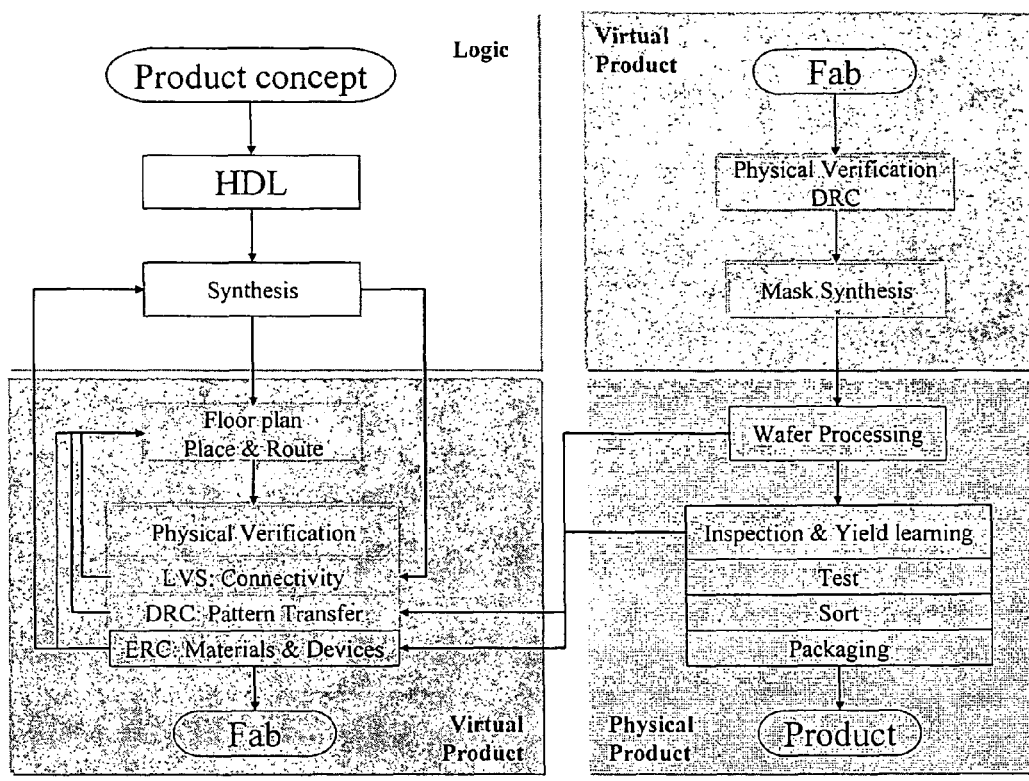
Figure 5. Typical IC-design flow.
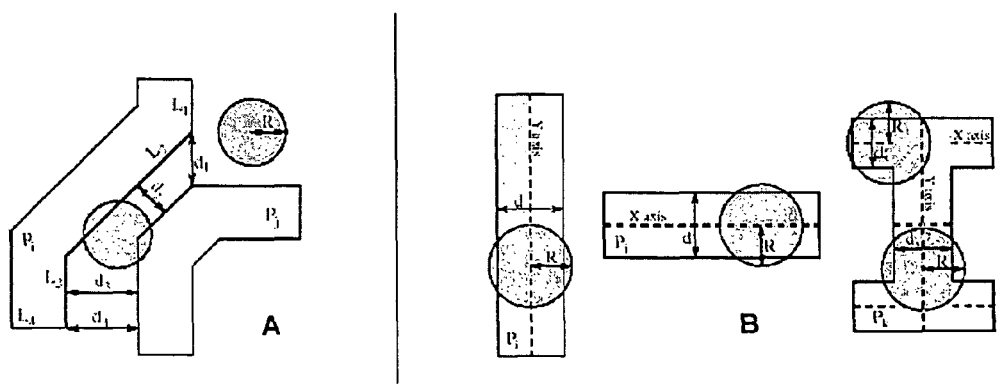
Figure 6. Critical area calculation depicting short (A) and open (B) defects.

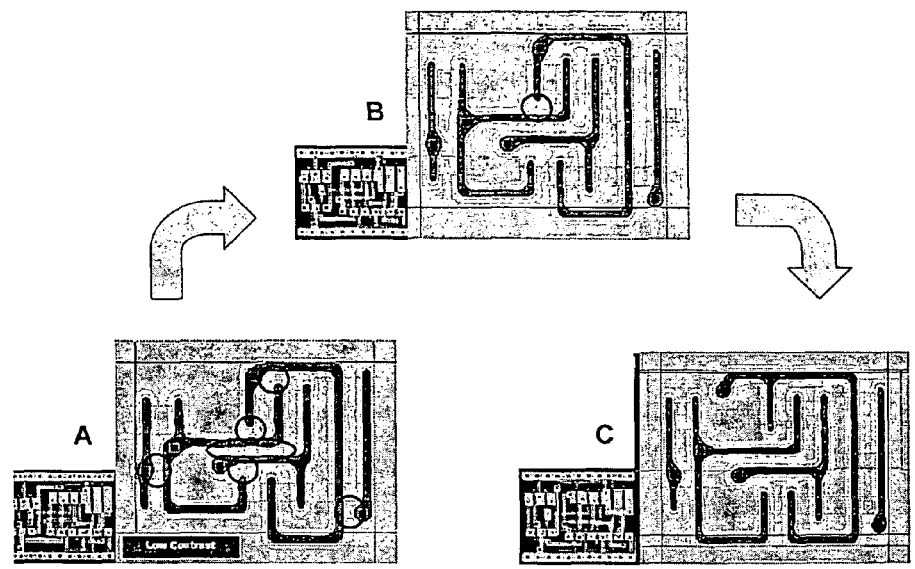
Figure 7. Example of contrast-based driven DFM optimization for a 130 nm standard cell. Original layout (A), Intermediate Layout (B) and optimal layout (C).
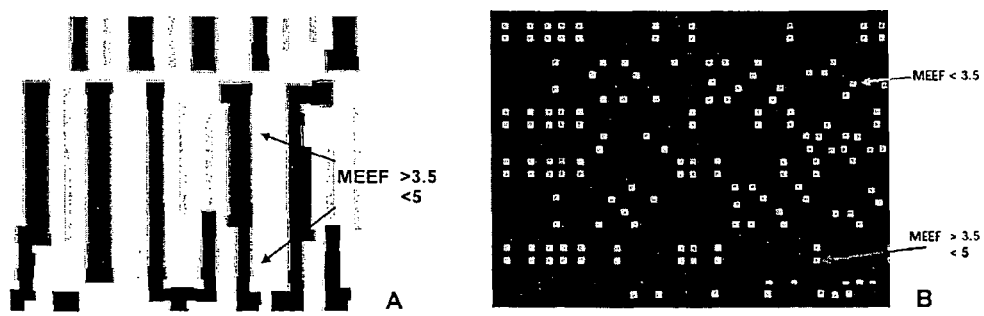
Figure 8. High-sensitivity feature detection: typical poly layer (A) and typical contact array (B).

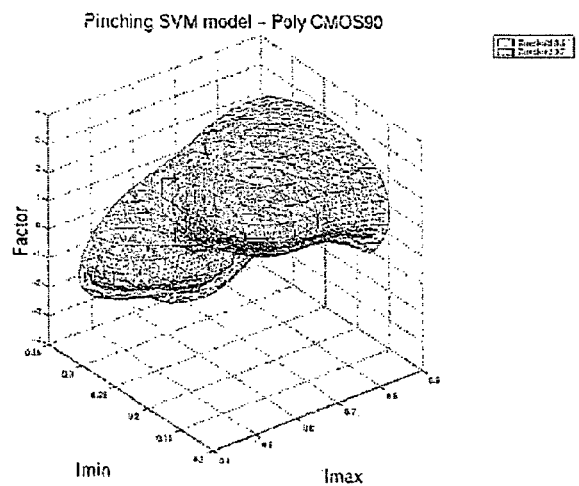
Figure 9. Pinch-failure model for a 90 nm process. The surface indicates the boundary between failure and robust printing.
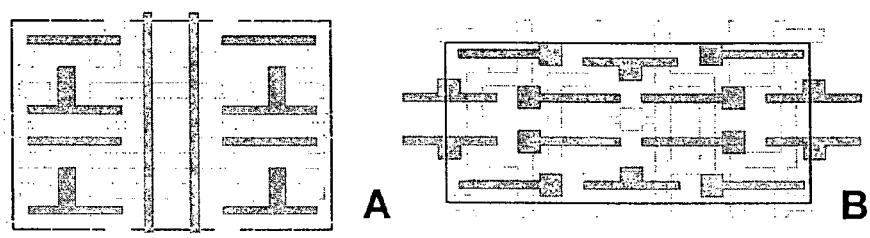
Figure 10. Example of restricted design rules. Polysilicon layer for a typical (A) and a more manufacturable (B) SRAM cell.

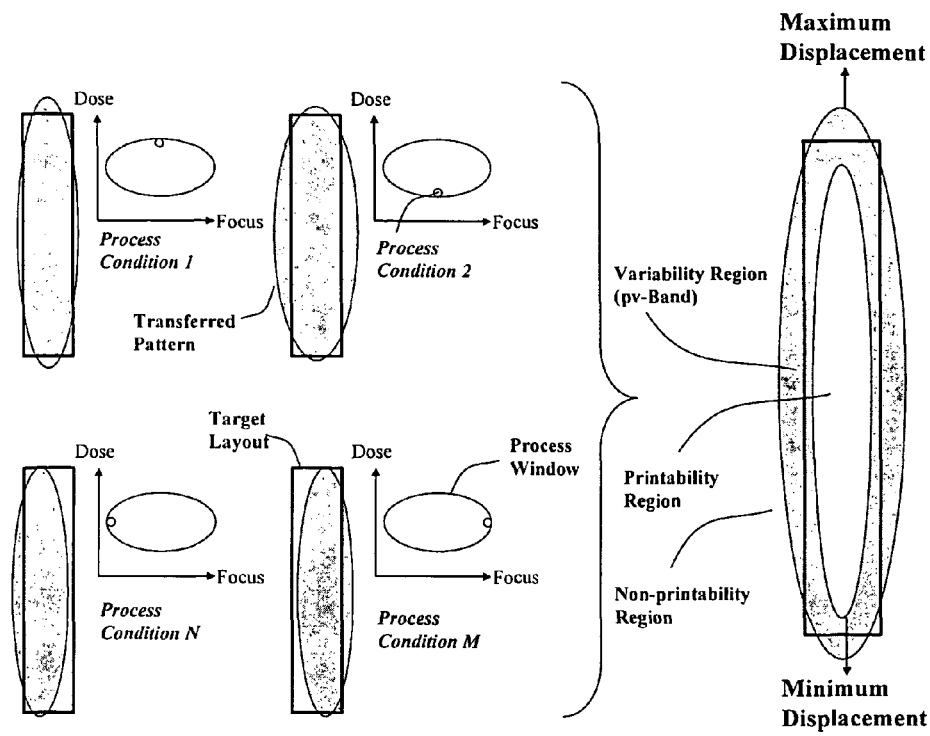
Figure 11. pv-Band calculation. At every point within the process window, a pattern transfer image is calculated. The region inside the pv-Band corresponds to the constantly printing region, and the band itself (gray) corresponds to the variability region that indicates probable locations of the boundary between printing and non-printing.

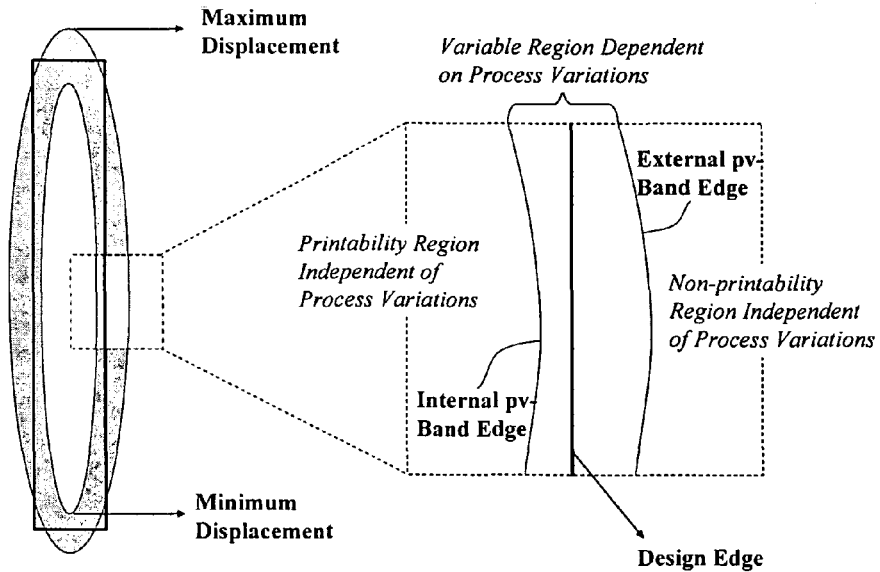
Figure 12. pv-Band elements. The internal pv-Band edge is the boundary between the printability and variable regions. The external pv-Band edge is the boundary between the variable and non-probability regions.
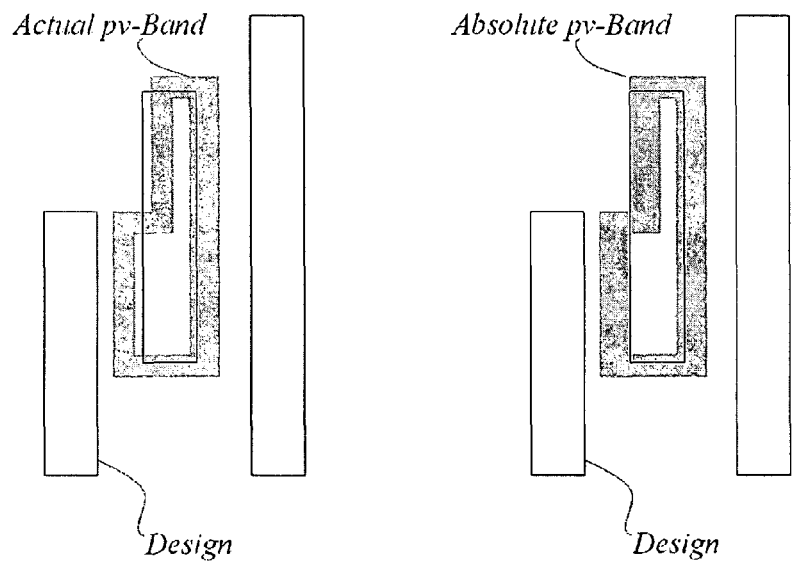
Figure 13. Actual Vs Relative pv-Bands.

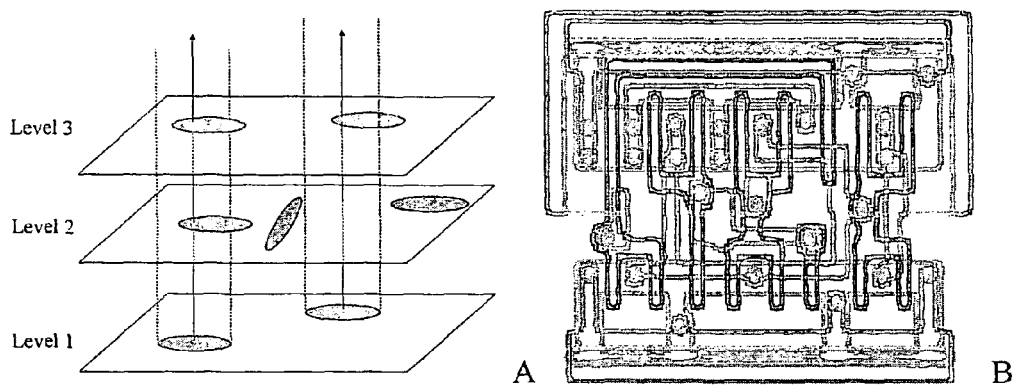
Figure 14. This design comprises several layers, and the final composite sensitivity is a weighted combination of all individual sensitivities along the connectivity line-of-sight and the unconnected line-of-sight. A shows the concept, and B shows the actual implementation in a 130 nm cell.
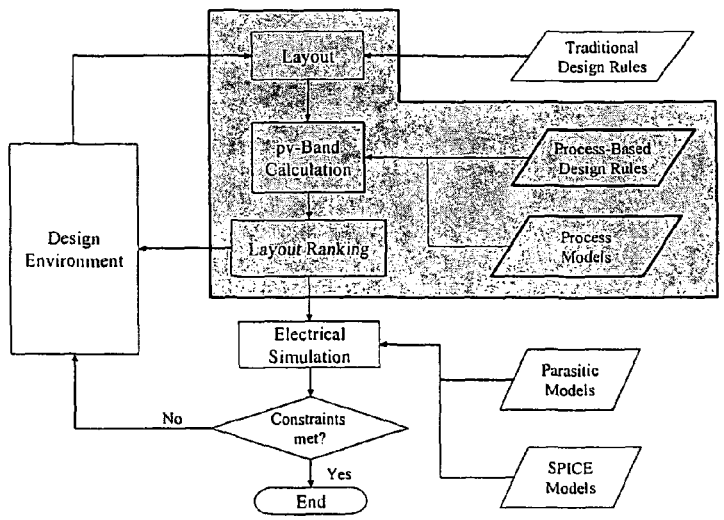
Figure 15. Enhanced design flow using the methodology proposed in this work.

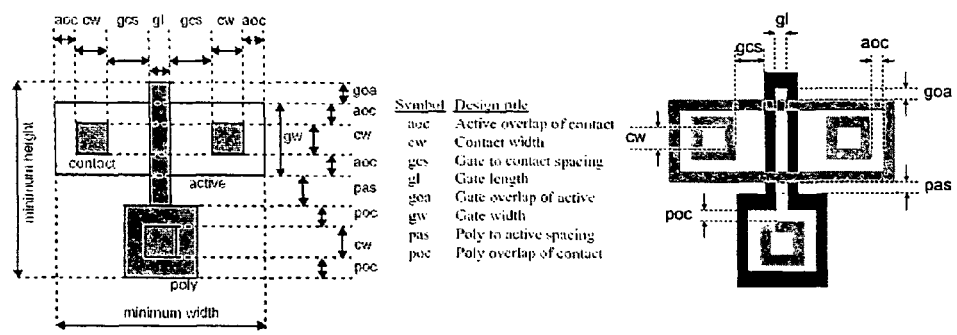
Figure 16. Typical design rules (left) versus pv-Band-based design rules (right).
Figure 17. Single-layer pv-Band interaction. The internal and external distances of the pv-Bands determine the pass-fail criterion.

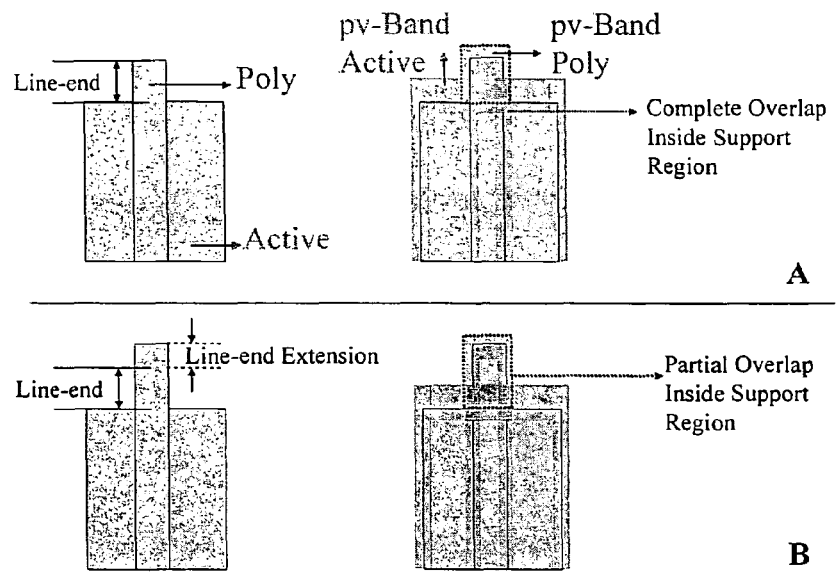
Figure 18. Two-layer pv-Band interaction. The enclosure rules are determined by incomplete overlap existence.
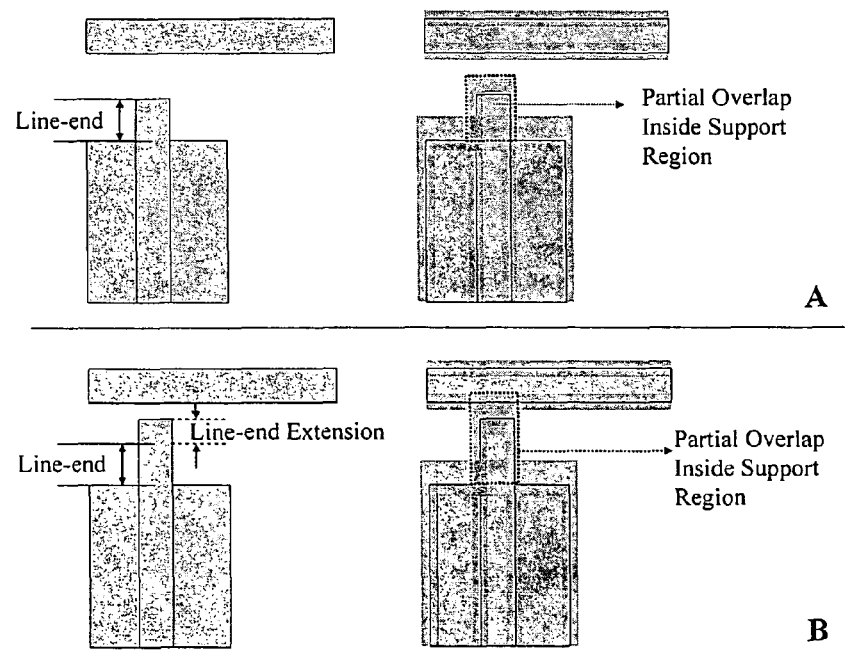
Figure 19. Two-layer pv-Band interaction. Different topology environment.

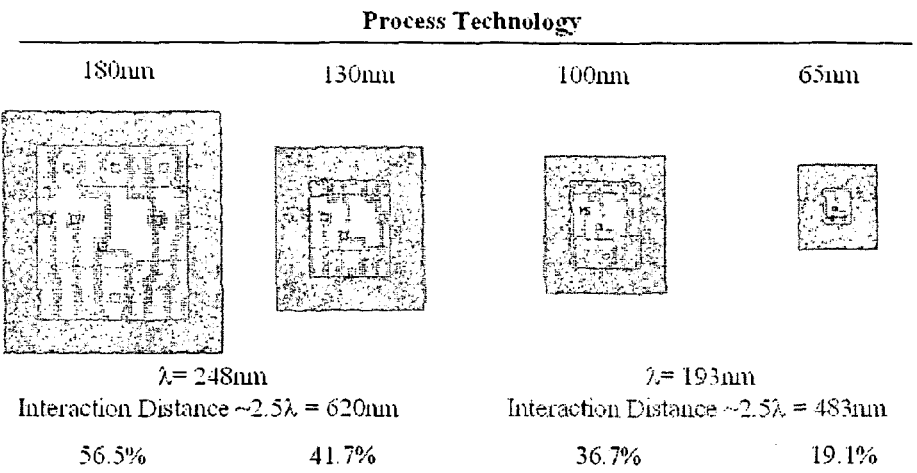
Figure 20. Placement-independent areas for multiple process nodes.
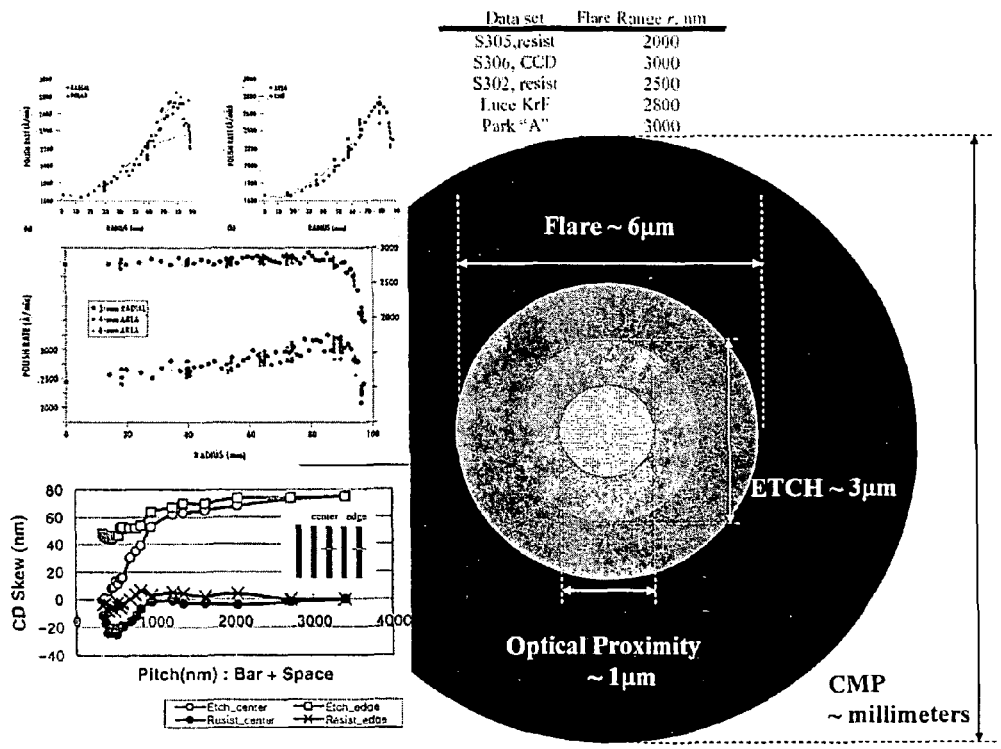
Figure 21. Typical ranges for four mechanisms involved during pattern transfer: chemical metal polish (CMP), optical flare, etch and optical proximity.

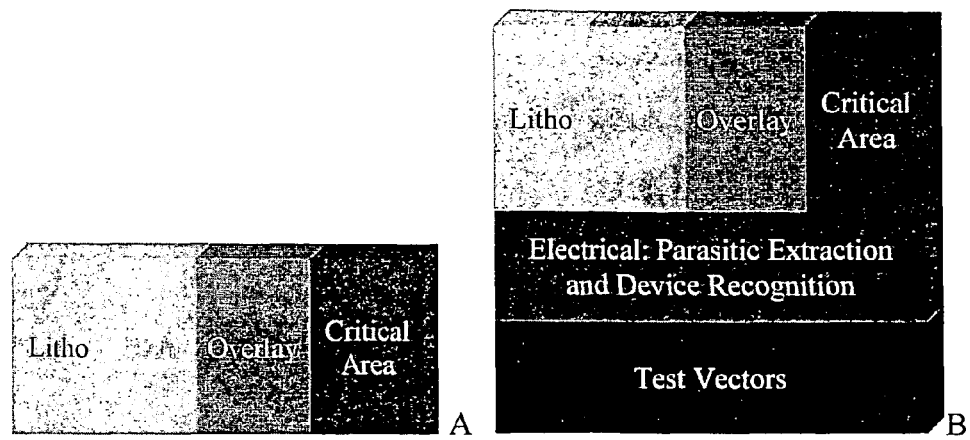
Figure 22. DFM model proposal for analysis and correction (A); coupling the manufacturing information with electrical information to determine the functionality of a device for analysis purposes (B).
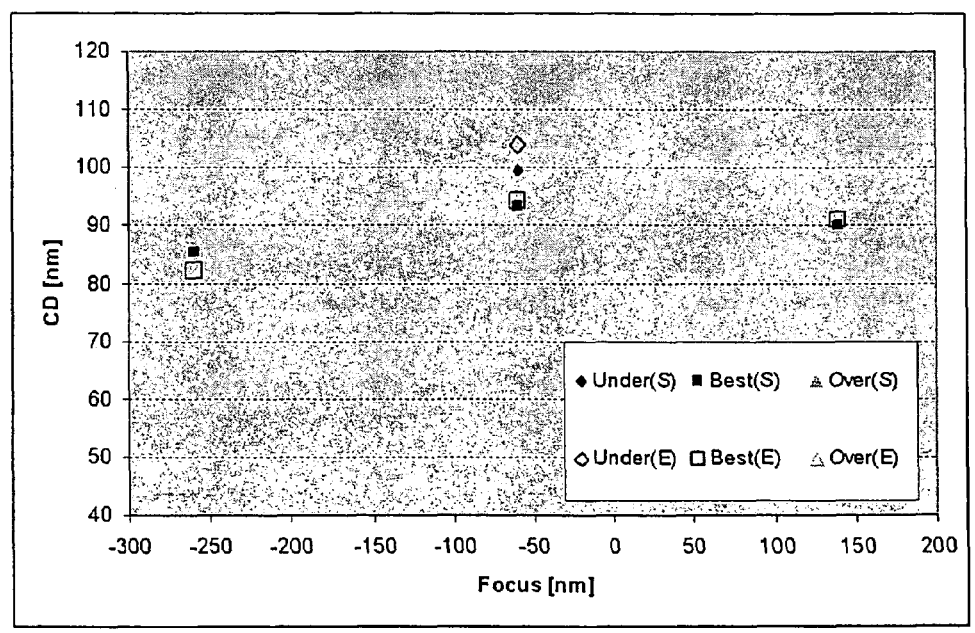
Figure 23. 90 nm isolated feature with SRAF at five points of the process window.

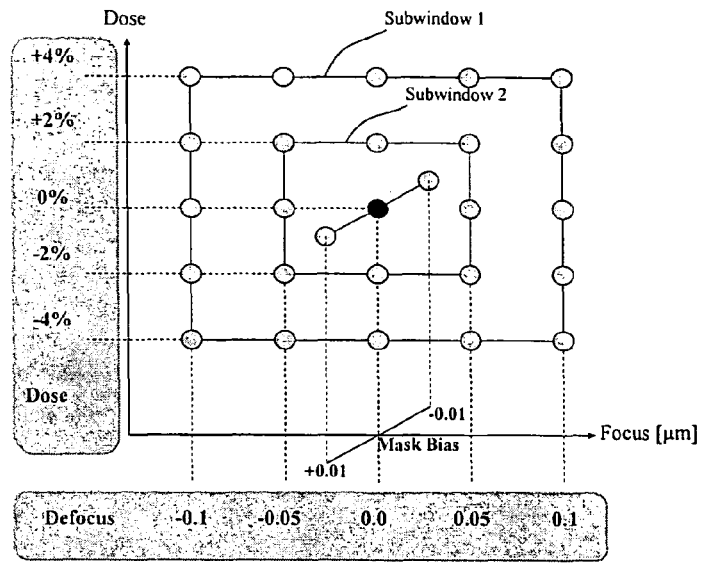
Figure 24. Dense calculation of multiple process conditions.
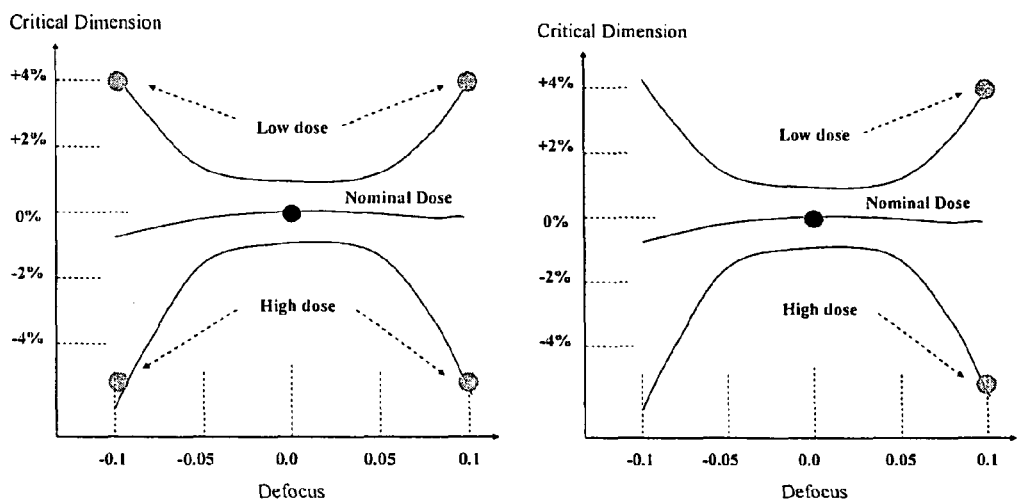
Figure 25. Effect of Exposure Dose and Defocus for a Clear field line. Indicating four process corners (left). Indicating response corners (right).

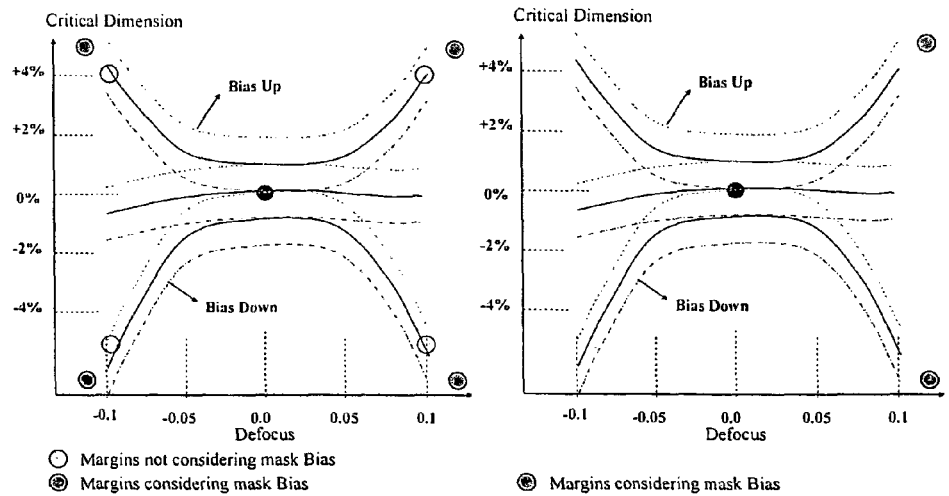
Figure 26. Dose, Defocus and Mask Bias variations and their impact in CD for a clear field, dark feature.
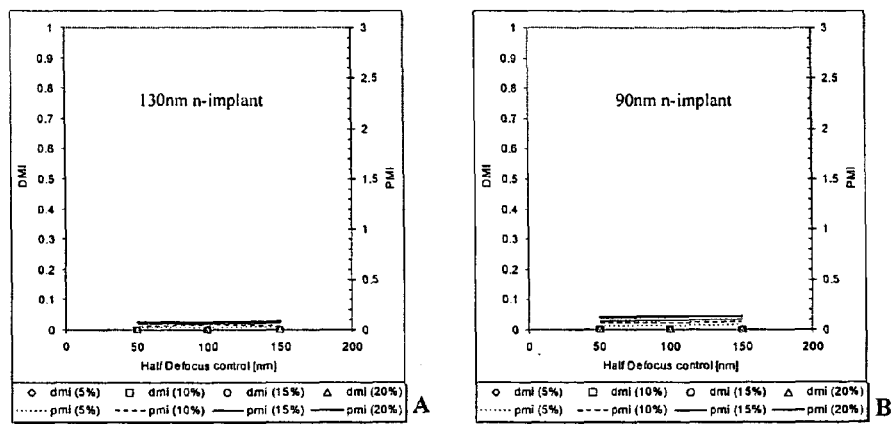
Figure 27. Process and design manufacturability indices for an n-implant layer: 130 nm process (A) and 90 nm process (B). n-implant layers are typically composed of large features.

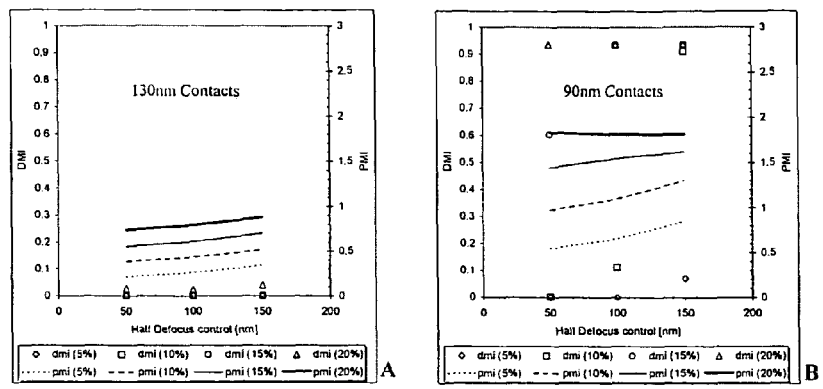
Figure 28. Process and design manufacturability indices for a contact layer: 130 nm process (A) and 90 nm process (B).
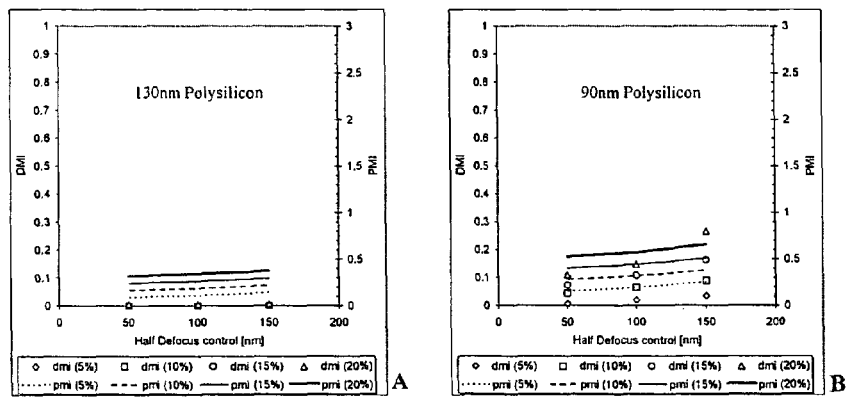
Figure 29. Process and design manufacturability indices for a polysilicon layer: 130 nm process (A) and 90 nm process (B).

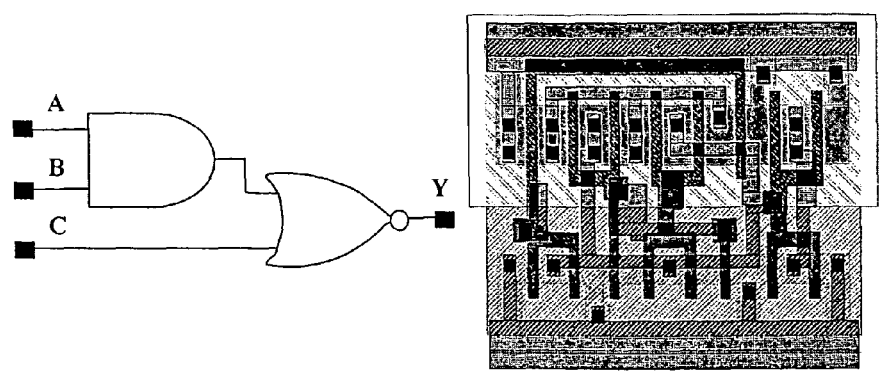
Figure 30. Schematic and initial physical implementation.
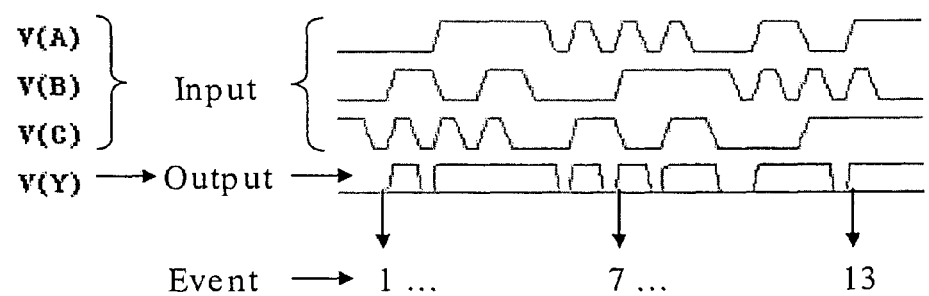
Figure 31. Event definition. Thirteen events were sampled for every litho-process condition.

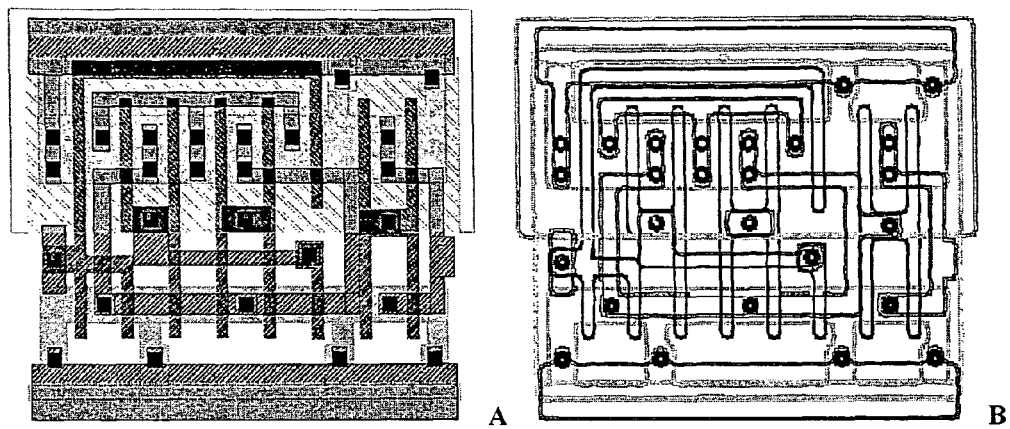
Figure 32. Optimal 130 nm physical implementation of the test cell (A) and respective pv-Bands for all layers (B).
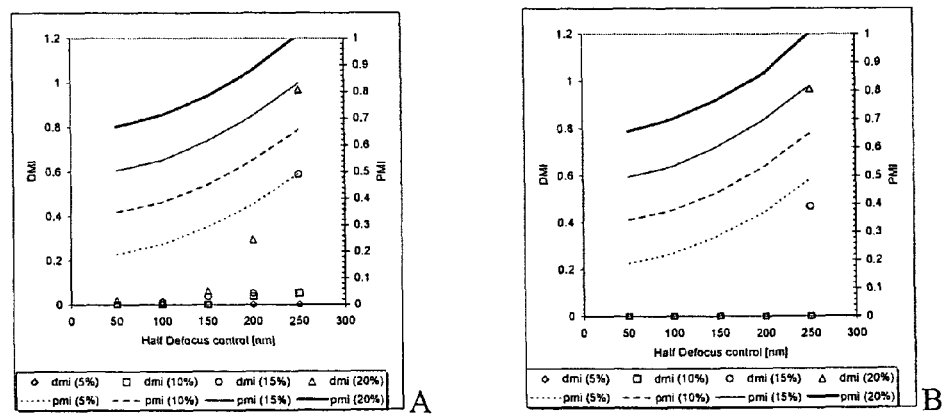
Figure 33. Manufacturability indices for contacts (130 nm technology): original cell (A) and optimized cell (B).

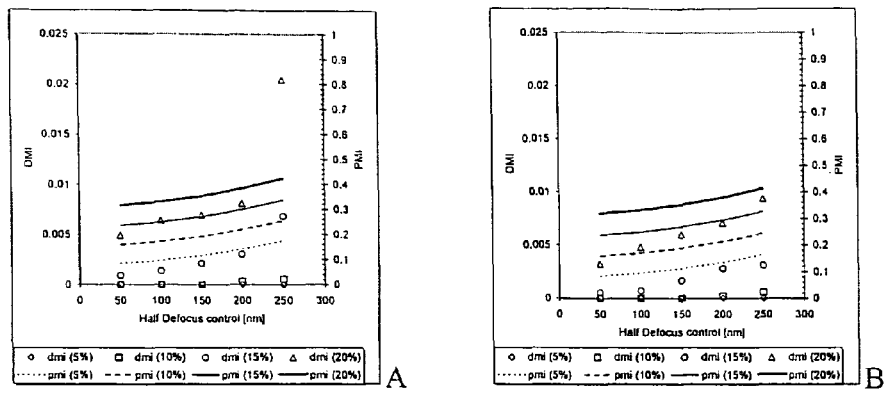
Figure 34. Manufacturability for polysilicon (130 nm technology): original cell (A) and optimized cell (B).
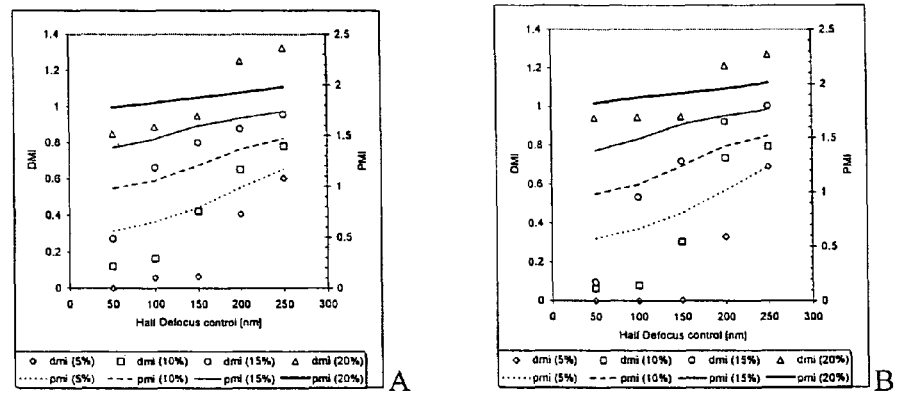
Figure 35. Manufacturability indices for contacts (90 nm technology): original 130 nm cell shrunk to 90 nm (A) and optimized 130 nm cell shrunk to 90 nm (B).

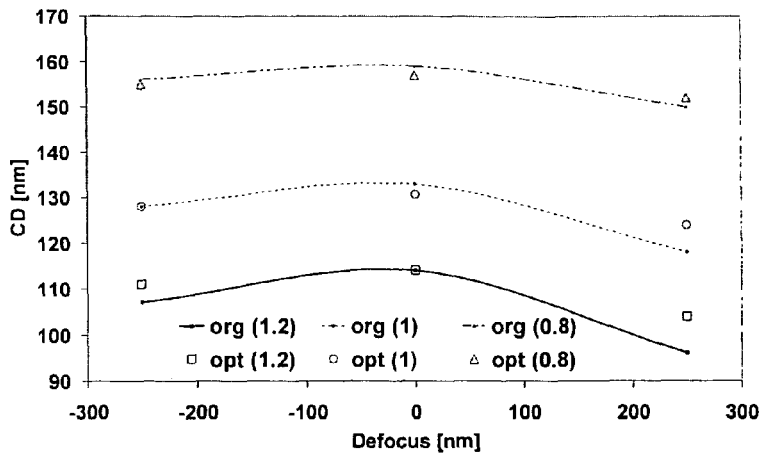
Figure 36. Focus-exposure "Bossung" graph showing the CD behavior across focus and energy dose for the same transistor.
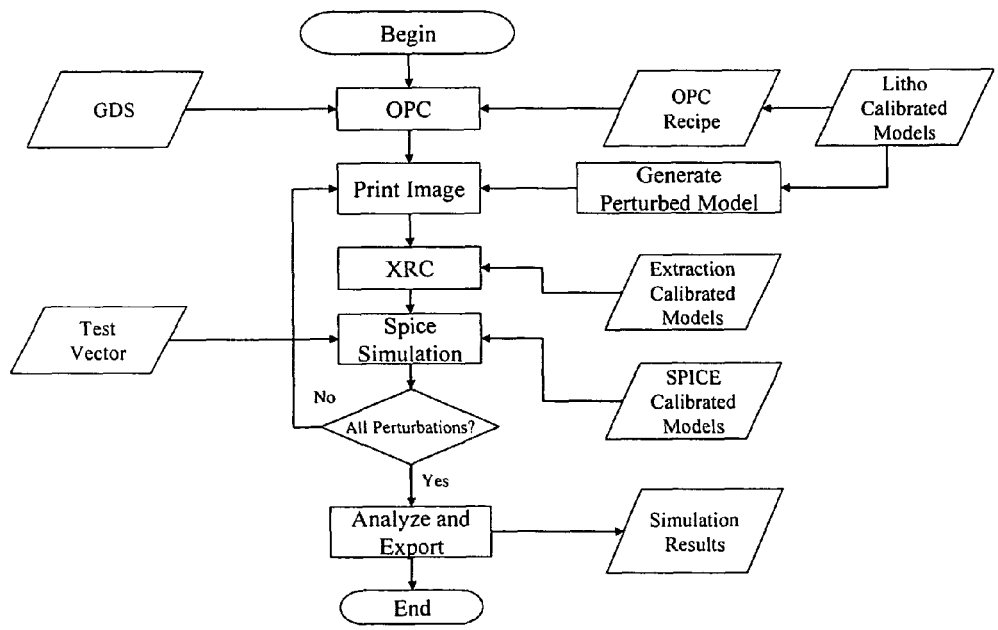
Figure 37. Electrical analysis for designs subject to process fluctuations during manufacturing.

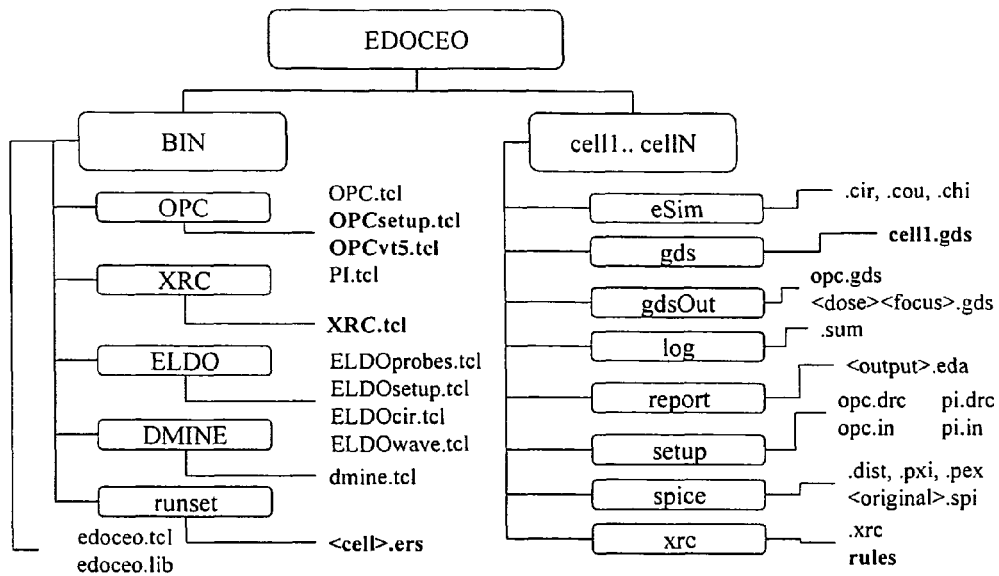
Figure 38. EDOCEO components.
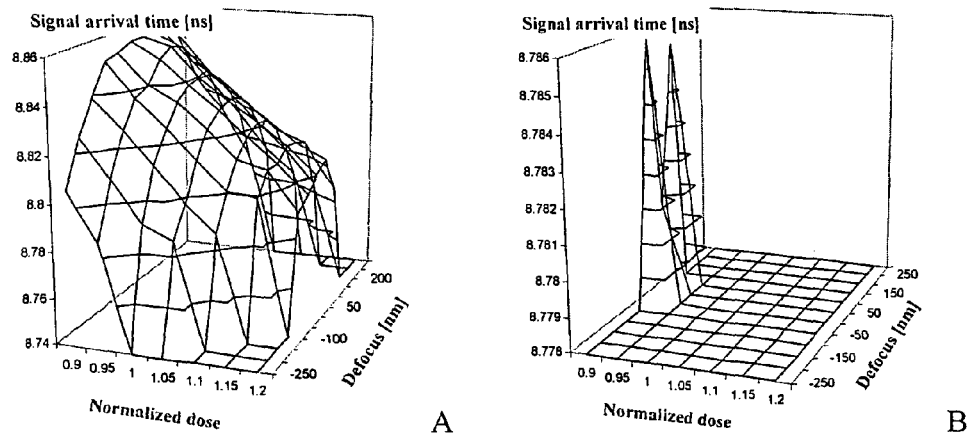
Figure 39. Clocked element results: dose (front horizontal axis), focus (perpendicular to the page plane axis) and signal arrival time (vertical axis), with OPC (A) and without OPC (B).

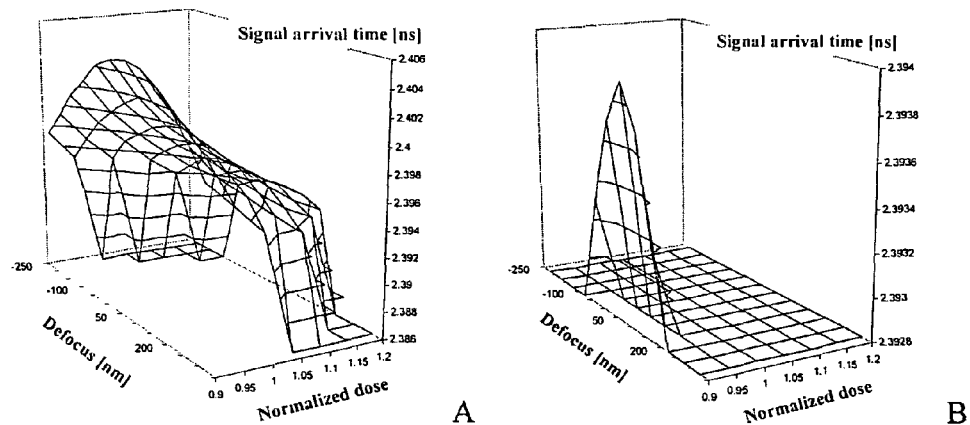
Figure 40. Unclocked elements: dose (front horizontal axis), focus (perpendicular to the page plane axis), and signal arrival time (vertical axis), with OPC (A) and without OPC (B).
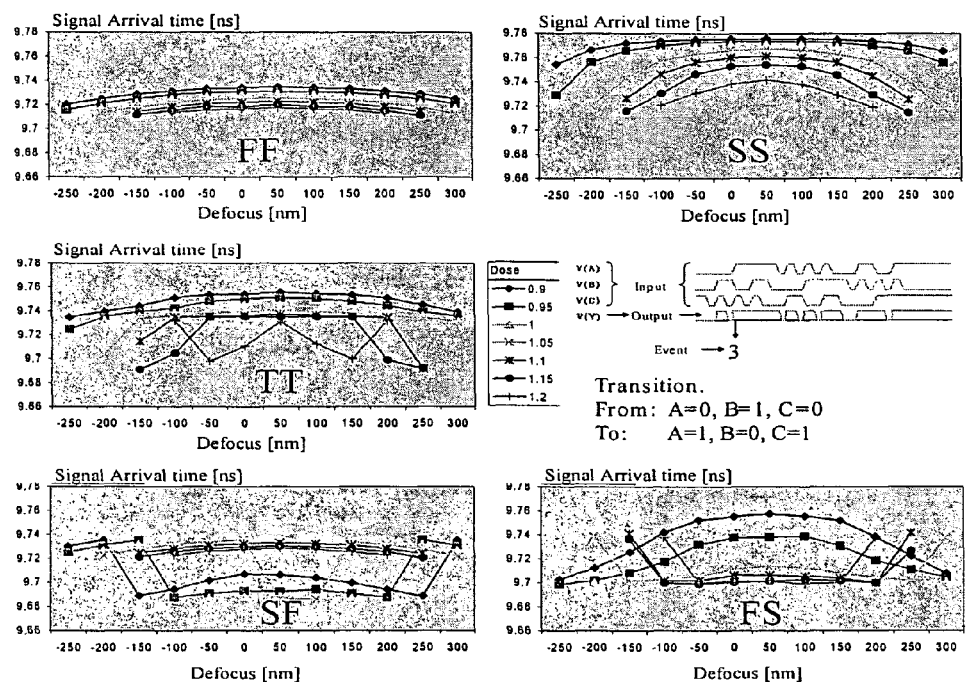
Figure 41. Original cell timing: signal arrival times for event 3, using FF, SS, TT, SF and FS SPICE models.

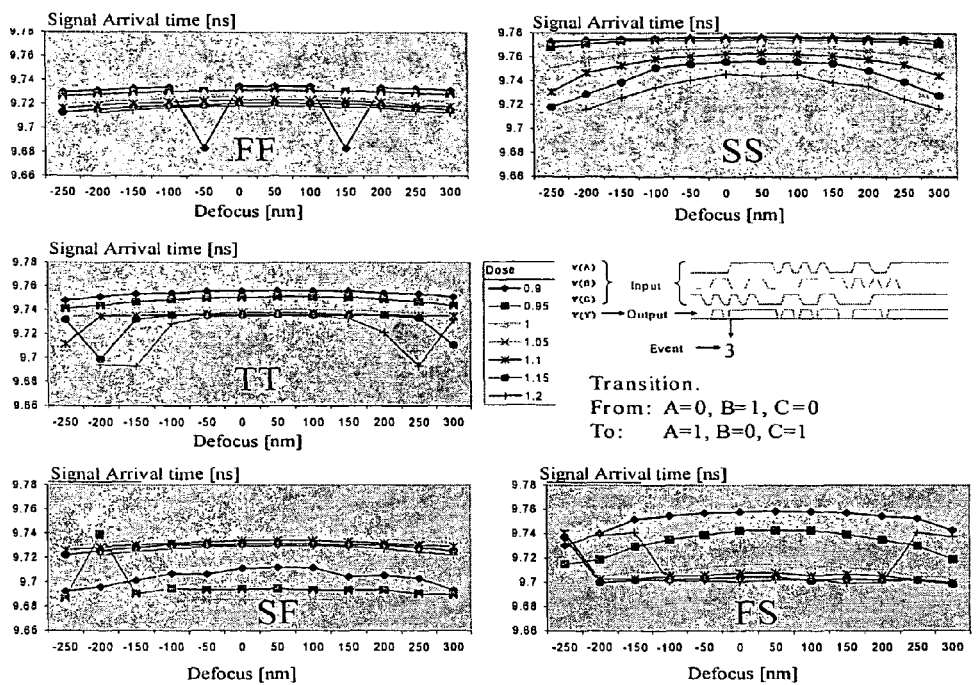
Figure 42. Optimized cell timing: signal arrival times for event 3 using FF, SS, TT, SF and FS SPICE models.

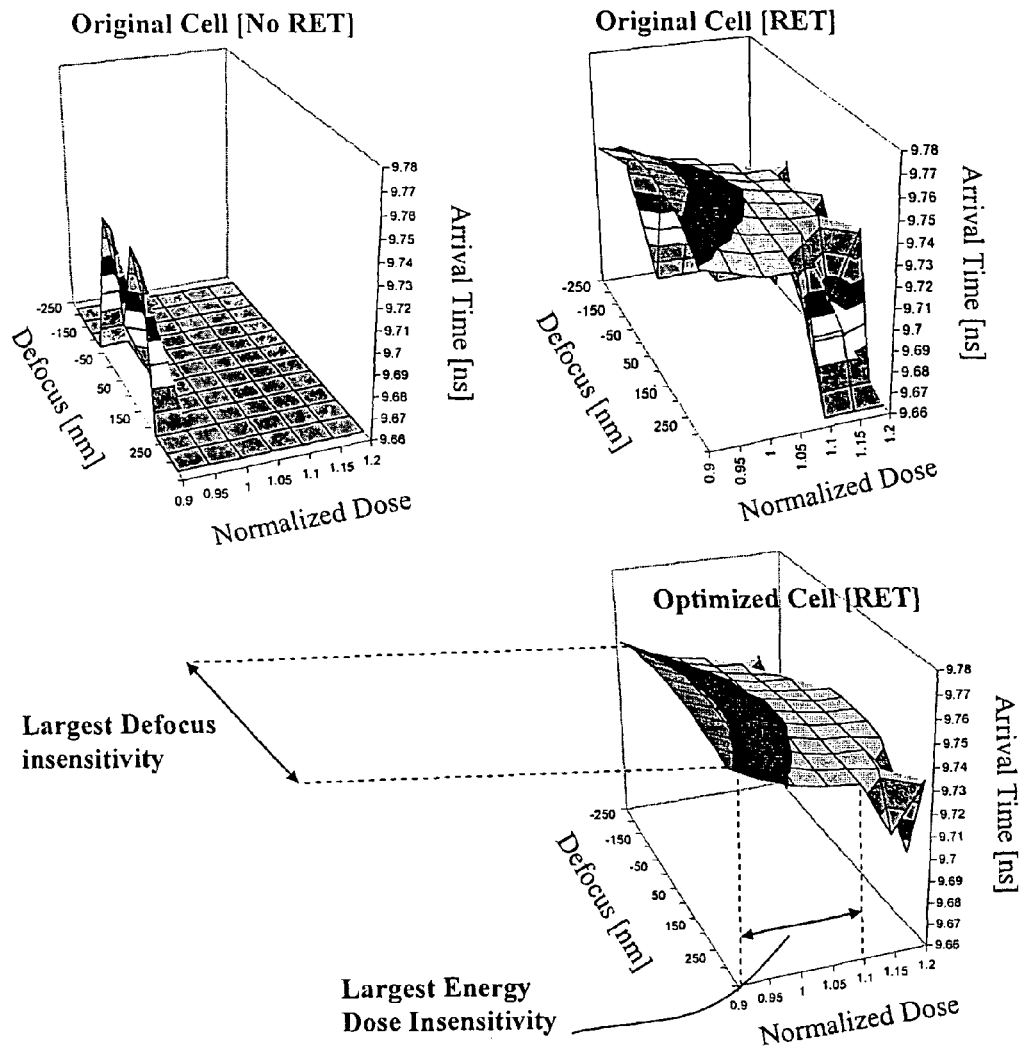
Figure 43. Pattern robustness translates into more consistent timing. (Nominal SPICE model shown.)

INTEGRATED CIRCUIT LAYOUT DESIGN METHODOLOGY WITH PROCESS VARIATION BANDS

CROSS-REFERENCE(S) TO RELATED APPLICATION(S)

The present application claims the benefit of U.S. Provisional Application Nos. 60/655,837, filed Feb. 23, 2005, and 60/568,849 filed May 7, 2004, which are herein incorporated by reference.

FIELD OF THE INVENTION

The present invention relates to photolithographic processing in general, and in particular, to methods of verifying integrated circuit designs for manufacturability due to process variations.

BACKGROUND OF THE INVENTION

In a conventional integrated circuit design process, a circuit designer begins with a conceptual idea of what functions an integrated circuit is to perform. The circuit designer then creates a circuit design on a computer and verifies it using one or more simulation tools to ensure that the circuit will operate as desired. The design at this stage may be represented by what is commonly viewed as a circuit schematic, but may also be represented by higher level abstractions within the computer.

These abstract designs are then converted to physical definitions of the circuit elements to be fabricated. These definitions, often called the circuit layout, represent the geometric boundaries for the physical devices to be fabricated—transistor gates, capacitors, resistive interconnecting wires, etc. A number of data formats have been created to represent these physical layouts, including GDS-II and OASIS™. Often, each physical layer of the circuit has a corresponding data layer to represent the polygonal boundaries of the elements in that layer.

Once the circuit layout has been defined, additional verification checks are performed. Some of these verification checks are to insure that the physical structures will correctly represent the desired electrical behavior. This is commonly called a LVS, for Layout vs. Schematic or Layout vs. Source. Additional extraction of parasitic resistances and capacitances can be done, and the dynamic behavior of the circuit can be estimated for the layout as well. This step is traditionally called parasitic extraction.

Other verification checks are carried out to ensure that the circuit layout can be manufactured with a particular process. For example, the layout may be subject to one or more design rule checks (DRCs) to ensure that the circuit does not contain any violations of circuit element placement or configurations that cannot be manufactured by the specified manufacturing process. In addition, resolution enhancement techniques (RETs), such as optical and process correction (OPC), may be applied to pre-compensate for the expected optical distortions that occur in the photolithographic process. The verified and OPC corrected layout data is then used to make a number of photolithographic masks or reticles that are used in the selected photolithographic process to image patterns on a semiconductor wafer in order to manufacture the desired circuit.

While the above methodology works well for manufacturing integrated circuits under expected photolithographic process conditions, these process conditions can vary. For example, variations can occur in the focus of the image on the wafer, the dose of illumination light through the mask or reticle, the placement of a stepper, as well as other process conditions that affect how the circuit will be created on the wafer. In the past, there has not been a reliable method of taking into account the process variations that may occur when designing a circuit so that the circuit will operate as intended regardless of the conditions used to actually manufacture the circuit. As such, there is a need for a system that can consider and compensate for expected process variations during the design and verification procedure so that the layout can be made more robust and easier to manufacture.

SUMMARY OF THE INVENTION

To address the problems discussed above, the present invention is a method for verifying and/or compensating IC layouts for expected variations that occur in photolithographic processing. In accordance with one embodiment of the present invention, objects to be created on a wafer are modeled to determine ranges in the way the objects would be printed on the wafer under a variety of process conditions. In one embodiment, the ranges are stored as process variation bands (PV-bands) that specify the smallest and largest dimensions of an object that may be expected to print on a wafer. The PV-bands are analyzed by one or more rules to see if the circuit can be manufactured with the expected process conditions.

In accordance with an embodiment of the invention, different IC layouts can be ranked by their manufacturability in accordance with the PV-bands created for the objects. In another embodiment of the invention, the PV-bands can be used to determine when an IC layout is acceptable for manufacture.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 illustrates a maximum attainable yield for 500 nm, 350 nm, 250 nm, and 180 nm processes.

FIG. 2 illustrates a sub-wavelength gap and its correlation to maximum attainable yield.

FIG. 3 illustrates a mean defocus: Wafer component (Ia), field-by-field defocus residuals (removing systematic wafer component) (Ib) and field-by-field residuals.

FIG. 4 illustrates a reduction in maximum frequency resulting from within-die parameter fluctuations versus technology generation.

FIG. 5 illustrates a typical IC-design flow.

FIG. 6 illustrates a critical area calculation depicting short (A) and open (B) defects.

FIG. 7 illustrates an example of contrast-based driven DFM optimization for a 130 nm standard cell. Original layout (A), Intermediate Layout (B), and Optimal Layout (C).

FIG. 8 illustrates high-sensitivity feature detection: typical poly layer (A) and typical contact array (B).

FIG. 9 illustrates a pinch-failure model for a 90 nm process.

Figure 0A:
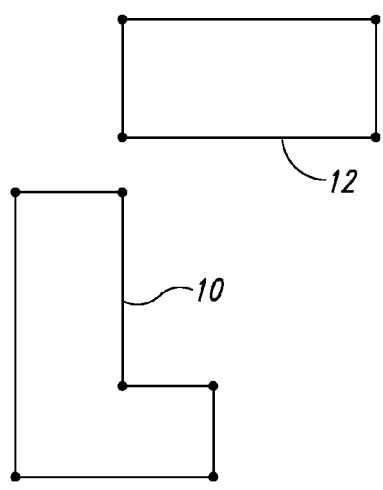
FIGS. 0A-0D illustrate a portion of a simplified IC layout, its corresponding PV-bands and a variable process in accordance with one embodiment of the present invention.

The surface indicates the boundary between failure and robust printing.

FIG. 10 illustrates an example of restricted design rules. Polysilicon layer for a typical (A) and a more manufacturable (B) SRAM cell.

FIG. 11 illustrates a PV-band calculation in accordance with one embodiment of the invention. At every point within the process window, a pattern transfer image is calculated. The region inside the PV-band corresponds to the constantly printing region, and the band itself (gray) corresponds to the variability region that indicates probable locations of the boundary between printing and non-printing.

FIG. 12 illustrates PV-band elements in accordance with one embodiment of the invention. The internal PV-band edge is the boundary between the printability and variable regions. The external PV-band edge is the boundary between the variable and non-probability regions.

FIG. 13 illustrates actual versus relative PV-bands in accordance with one embodiment of the invention.

FIG. 14 illustrates a layout comprising several layers, and the final composite sensitivity is a weighted combination of all individual sensitivities along the connectivity line-of-sight and the unconnected line-of-sight. A shows the concept, and B shows the actual implementation in a 130 nm cell.

FIG. 15 illustrates an enhanced design flow using the methodology proposed in this work in accordance with one embodiment of the invention.

FIG. 16 illustrates typical design rules (left) versus PV-band-based design rules (right) in accordance with one embodiment of the invention.

FIG. 17 illustrates a single-layer PV-band interaction. The internal and external distances of the PV-Bands determine the pass-fail criterion.

FIG. 18 illustrates a two-layer PV-band interaction. The enclosure rules are determined by incomplete overlap existence.

FIG. 19 illustrates a two-layer PV-band interaction. Different topology environment.

FIG. 20 illustrates placement-independent areas for multiple process nodes.

FIG. 21 illustrates typical ranges for four mechanisms involved during pattern transfer: chemical metal polish (CMP), optical flare, etch, and optical proximity.

FIG. 22 illustrates a DFM model proposal for analysis and correction (A); coupling the manufacturing information with electrical information to determine the functionality of a device for analysis purposes (B).

FIG. 23 illustrates a 90 nm isolated feature with SRAF at five points of a process window.

FIG. 24 illustrates a dense calculation of multiple process conditions.

FIG. 25 illustrates the Effect of Exposure Dose and Defocus for a Clear field line. Indicating four process corners (left). Indicating response corners (right).

FIG. 26 illustrates Dose, Defocus and Mask Bias variations and their impact in CD for a clear field, dark feature.

FIG. 27 illustrates process and design variability indices for an n-implant layer: 130 nm process (A) and 90 nm process (B). n-implant layers are typically composed of large features.

FIG. 28 illustrates process and design variability indices for a contact layer: 130 nm process (A) and 90 nm process (B).

FIG. 29 illustrates process and design variability indices for a polysilicon layer: 130 nm process (A) and 90 nm process (B).

FIG. 30 illustrates a schematic and initial physical implementation.

FIG. 31 illustrates an event definition. Thirteen events were sampled for every litho-process condition.

FIG. 32 illustrates optimal 130 nm physical implementation of the test cell (A) and respective PV-Bands for all layers (B).

FIG. 33 illustrates manufacturability indices for contacts (130 nm technology): original cell (A) and optimized cell (B).

FIG. 34 illustrates manufacturability for polysilicon (130 nm technology): original cell (A) and optimized cell (B).

FIG. 35 illustrates manufacturability indices for contacts (90 nm technology): original 130 nm cell shrunk to 90 nm (A) and optimized 130 nm cell shrunk to 90 nm (B).

FIG. 36 illustrates a focus-exposure "Bossung" graph showing the CD behavior across focus and energy dose for the same transistor.

FIG. 37 illustrates electrical analysis for designs subject to process fluctuations during manufacturing.

FIG. 38 illustrates EDOCEO components.

FIG. 39 illustrates clocked element results: dose (front horizontal axis), focus (perpendicular to the page plane axis) and signal arrival time (vertical axis), with OPC (A) and without OPC (B).

FIG. 40 illustrates unclocked elements: dose (front horizontal axis), focus (perpendicular to the page plane axis), and signal arrival time (vertical axis), with OPC (A) and without OPC (B).

FIG. 41 illustrates original cell timing: signal arrival times for event 3, using FF, SS, TT, SF and FS SPICE models.

FIG. 42 illustrates optimized cell timing: signal arrival times for event 3 using FF, SS, TT, SF and FS SPICE models.

FIG. 43 illustrates pattern robustness translates into more consistent timing. (Nominal SPICE model shown.)

DETAILED DESCRIPTION OF THE PREFERRED EMBODIMENT

As indicated above, the present invention is a system for verifying and/or classifying integrated circuit layouts and designs in accordance with anticipated variations in the manufacturing process. Although the present invention is described with respect to the creation of integrated circuits, it will be appreciated that the techniques of the invention can be applied to any manufacturing process that is subject to process variations. Examples of such processes include, but are not limited to mask bias, overlay errors, film stack thickness variations, mask phase errors, post-exposure bake temperatures, resist development times and post exposure bake times. Other devices fabricated lithographically where this invention may be applied may include Micro-electromechanical systems (MEMS), magnetic heads for disk drives, photonic devices, diffractive optical elements, nanochannels for transporting biological molecules, etc.

FIG. 0A illustrates a simplified integrated circuit layout including a pair of objects or features 10, 12 to be created on a semiconductor wafer. In conventional lithographic processing, a layout for an IC design is stored in a layout format, such as GDS-II or OASIS™, that defines the objects as a number of vertices that in turn define corresponding polygons. The edges of the polygons defined between the vertices can then be further fragmented into additional, smaller edge segments and adapted to ensure the manufacturability of the polygons on a wafer.

Figure 0B:
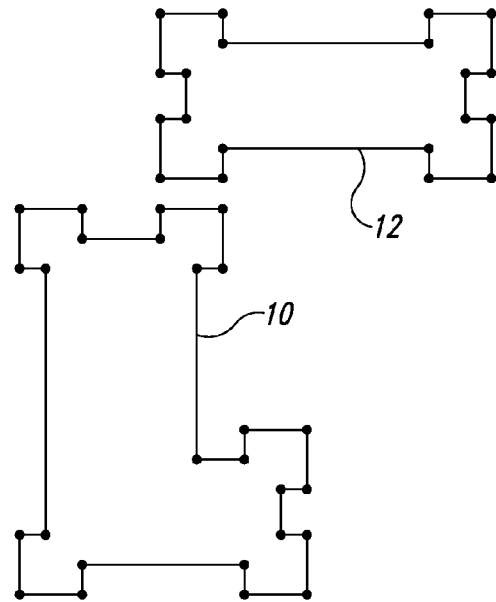

FIG. 0B illustrates the polygons after a resolution enhancement technique (RET), such as optical and process correction (OPC), is performed. In the example shown, the OPC tool varies the polygons by biasing the edge fragments found at corners of the polygons outwardly in order to compensate for line-end, shortening, and other defects that occur during the photolithographic printing process.

Although the OPC corrected layout of the features 10, 12, shown in FIG. 0B compensates for expected optical distortions, such distortions are generally calculated assuming a set of known process conditions. However, as indicated above, process conditions can vary from wafer to wafer or from chip to chip within a wafer. Examples of process conditions that may vary include, but are not limited to, focus, dose, etch processing, polishing variations, etc.

Figure 0C:
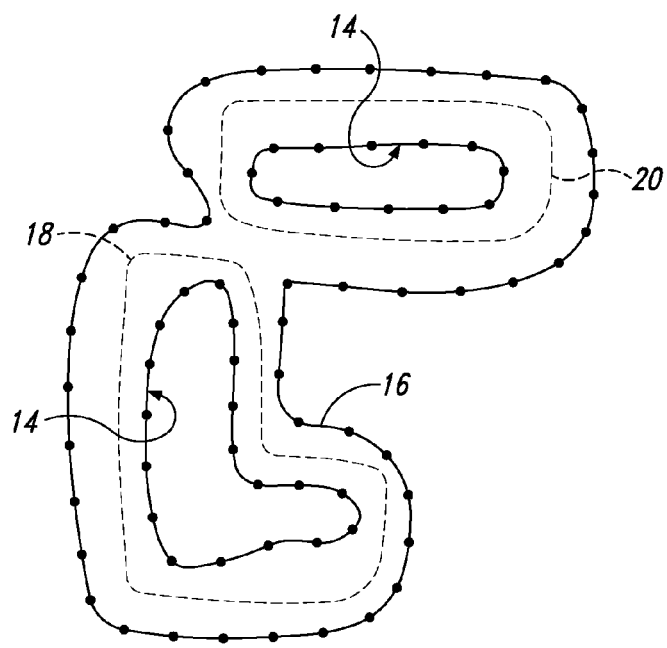

To take into consideration how process variations will affect the objects created on a wafer, one embodiment of the invention calculates process variation bands (PV-bands) that estimate how the objects will be printed on a wafer under a variety of process conditions. As shown in FIG. 0C, each PV-band includes an inner edge 14 that defines the expected minimum area an object will occupy on a wafer when printed under all process conditions. The PV-bands also include an outer edge 16 that define the maximum size that may be occupied by the objects when printed under some process conditions. The space between the inner edge 14 and the outer edge 16 defines a zone of uncertainty where the edges of the objects may be printed depending upon process conditions. Similarly, a PV-band may lack an inner edge if, under certain process conditions, an object will not print at all.

Figure 0D:
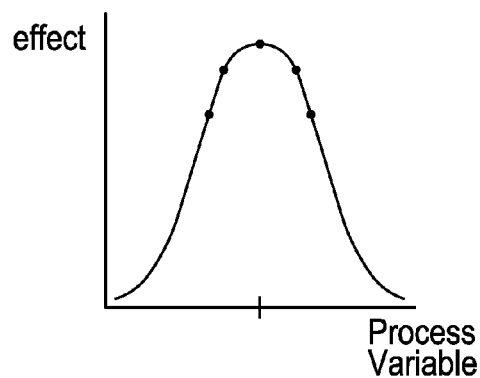

In one embodiment of the invention, the PV-bands are calculated by computing a number of silicon images of the objects under a number of process conditions. As shown in FIG. 0D, a representative process generally has a Gaussian type distribution, whereby changes in the process vary a desired effect on the wafer. The process variations may affect the position of a printed edge, the slope of the edge density, or a number of other factors that can be used to predict the final edge placement of the objects on the wafer. In one embodiment, aerial images are calculated at the nominal condition of the process, as well as at several sample points around the nominal. Those points are typically supplied by a user who is familiar with actual process variations.

Increasing the number of process points for which the aerial image is computed increases the precision of the PV-band contours at the expense of increasing the processing time required to compute the PV-bands. For example, if the aerial images are calculated assuming N different variables in a process, and aerial images are computed at M values for each variable, then a total of N*M aerial mages must be computed for each object. In one embodiment, the combination producing the smallest printing of the object is selected as the inner edge of the PV-band, and the aerial image that produces the largest printing of the object is selected as the outer edge of the PV-band.

As will be appreciated, if additional process variations are analyzed and/or if additional points are analyzed for each process, the number of aerial images to be computed rises geometrically. Although each aerial image calculation can be handled by a multi-processor or parallel processing computer system, the time required to calculate the PV-bands may be a factor in selecting how many process variables and how many sample points of each process are analyzed. One technique to reduce the number of aerial images that must be calculated is described in further detail below.

In one embodiment of the invention, the selected inner edge and outer edge of the PV-bands are stored as separate data layers of an OASIS data file, separate layers of a GDSII file or any other layout database representation. Each data layer includes a number of vertices that define the contours of the outer or inner edges of the PV-bands. Alternatively, a single data layer could contain both edges of the PV-bands.

As an alternative to calculating the aerial images under a variety of different process conditions, it is also possible to estimate the variations that occur with different process conditions by, for example, convolving the desired layout with a Gaussian function that is representative of the variations in process conditions.

Once the PV-bands are calculated for the objects to be created on a wafer, processing is performed with the PV-bands as surrogates for the objects to determine if the design meets acceptable criteria or if variations to the circuit layout need to be made. For example, as shown in FIG. 0C, the outer edge of the PV-band indicates that the objects 10 and 12 will blend together creating a short circuit under certain process conditions. Therefore, the designer can be alerted to this fact and can vary the layout by, for example, increasing the space between the objects 10, 12, or rearranging the layout so that the objects can be manufactured correctly regardless of process conditions. The present invention can also be used to compare two or more layouts by their sensitivity to manufacturing process variations. In one embodiment, the area occupied by the PV-bands for the objects is indicative of the sensitivity of its objects to changes in process conditions. The smaller the area generally, the less sensitive the layout is to variations in the manufacturing processes. By summing the areas of all PV-bands in a layout, different layouts can be ranked. The layouts can represent different circuit designs or may represent iterations of the same design in order to determine if a change has improved the manufacturability of the design.

In addition, as will be explained by further detail below, areas of interest can be defined for different object or feature types. For example, contacts or circuit vias can have areas of interest that define a standard against which the feature can be compared. The PV-bands for an object are compared to the area of interest to check if the object will be formed correctly on the wafer. Alternatively, properties derived from the PV-bands such as PV-band width, area, perimeter, offset, enclosure, relative distance and overlaps can be compared to the areas of interest. Individual objects can then be ranked based on the comparison so that a designer can redesign those objects that vary the most from an ideal standard.

Figure 0E:
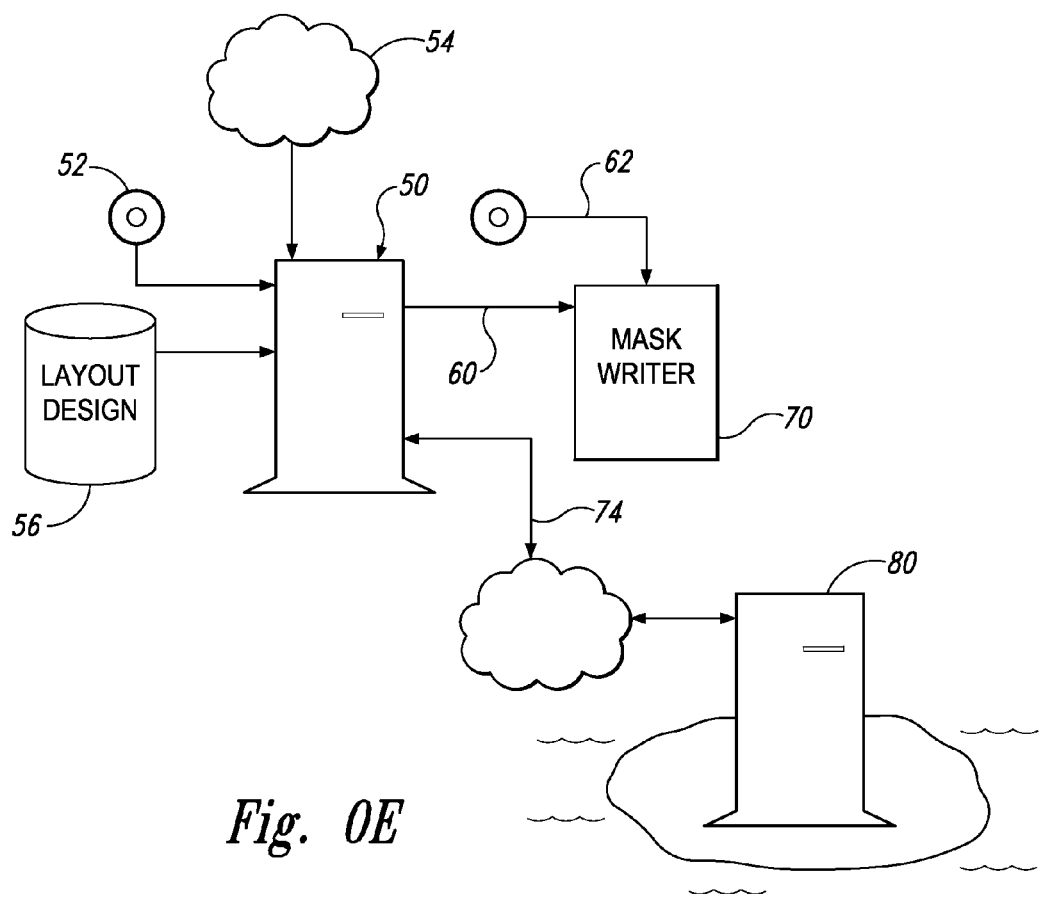
FIG. 0E illustrates a representative computer system in which an embodiment of the present invention may be implemented.

FIG. 0E illustrates one embodiment of a computer system that can be used to implement the present invention. A computer 50 comprising a stand alone or linked computer system receives a set of executable instructions on a computer readable media 52 or over a communication link 54. The computer 50 executes the sequence of instructions to perform the layout and design verification methods of the present invention.

A layout is received from a database 56 (or may be created with a circuit design tool running on the computer 50) that defines any number of objects to be created in an integrated circuit. The computer system analyzes the layout as described briefly above in further detail below. In one embodiment, the instructions cause the computer system to read the layout, or a portion thereof, and create PV-bands that are analyzed with one or more design rules to determine whether the layout design can be manufactured given variable process conditions. In one embodiment, the computer system alerts the designer to areas or particular objects in the layout that cannot be manufactured or can rank various layouts or designs by their sensitivity to process variations.

If the layout does not contain any errors or violations of the rules used to analyze the PV-bands, the layout is declared "LFD CLEAN" or some other designation indicating that the design can be manufactured by the selected photolithographic process. Here, LFD is an acronym standing for "Litho-Friendly Design". This is a term currently being used for layouts and designs with no detected manufacturability errors that have been "passed" for manufacturing, just as layouts that are "DRC CLEAN" are those with no design rule violations that have been "passed" for manufacturing. If desired, additional tools can analyze the design or the layout to ensure that it has the desired electrical characteristics once the manufacturability is confirmed. The computer system 50 then can forward the verified layout or design over a communication link 60 or on one or more computer readable media 62 to a mask writing tool 70. The mask writing tool then produces a number of masks or reticles that are used to produce the IC according to the specifications of the design using the selected photolithographic process.

Alternatively, the computer system 50 may transmit all or a portion of the layout or design to a remote computer system 80 over a wired or wireless communication link 74. The remote computer system 80 may be inside or outside of the United States. The remote computer system 80 can then generate and/or analyze the PV-bands for the layout and can analyze the PV-bands with one or more design rules. Upon checking, the corrected layout can be returned to the computer system 50 over the communication link 74. Alternatively, the computer system 80 can send the corrected layout directly to the mask writing tool 70.

As discussed above, during the design stage of integrated circuits (ICs), electronic designers have relied on functional and physical verification. The objective of functional verification is to determine the electrical correctness of the design; physical verification assures that an IC design will yield sufficient quantities to make the IC product commercially viable.

As we approach volume production of 90 nm devices, enter prototype production of 65 nm and carry out active research for 45 nm and 32 nm processes, there is one clear trend: the interdependence of manufacturing and design processes necessary to build integrated circuits has reached the point where an insufficient description of the process in physical verification design rules seriously jeopardizes the successful production of advanced microelectronic devices.

Existing physical verification design rules are primarily geometric in nature (e.g., spacing, enclosure, width, connectivity and area checks). These geometrical rules are empirical approximations of complex manufacturing behavior that includes optical, chemical and electrical phenomena. Unfortunately, the process and design communities have acknowledged that the current process information being transferred to the designer is no longer sufficient. Evidence of this lack of relevant process information during the design stage has been quantified in the form of historical yield learning curves and maximum attainable yield information. The study of such data indicates a decline in yield for the past process generations from a half micron to 180 nm.

To comprehend why newer process generations seem to produce lower maximum attainable yields (as shown in FIG. 1), it is important to understand the mechanisms that produce yield loss. Yield-loss mechanisms can be classified in two groups: random and systematic. The random classification includes particle contamination, scratches, solvent drips, residues, dose or focus drift and vibrations, and can be minimized only during the manufacture of a product. The second classification refers to predictable and reproducible phenomena that in principle can be pre-corrected. For example, by introducing optical proximity corrections it is possible to prevent lithography-induced, iso-dense biases. Similarly, dummy fill insertion is routinely used to minimize the feature degradation that arises from chemical and mechanical polishing (CMP) or optical flare induced by heterogeneous density environments.

Traditionally, there has been a strong drive to minimize the random components of yield loss, and special emphasis has been placed on reducing the concentration of particles that can land on the surface of a device. In 1995, Stapper and Rosnerin made an important observation: "The inverse-cube probability distribution function for defect sizes has an interesting consequence. It causes the random defect yield to remain invariant when linearly shrinking the ground rules of the photolithographic patterns and hence the chip dimensions." If this observation were correct, the yield curves presented in FIG. 1 should fluctuate around the same maximum yield number after the process is mature. Unfortunately, this finding applies only to processes where supra-wavelength effects dominate.

Prior to 1995, the wavelength of light was equal to or smaller than the target feature to be printed by the lithography process. FIG. 2A shows a well publicized graph that ties target feature dimensions to the wavelength used by the lithography process. Although resolution depends on many other variables in addition to wavelength, this graph nevertheless provides a good qualitative description of the effects that yield analysis tools need to address in order to process features smaller than a quarter micron.

FIG. 2B presents the maximum attainable yield per feature size and the yield learning curve for each process for a large variety of products and process implementations. The arrows connecting insets A and B attempt to qualitatively correlate the sudden jump in yield-loss to the size of the sub-wavelength gap. Interestingly, 180 nm processes were the first to introduce rudimentary forms of optical proximity corrections that are now used extensively and in more advanced forms for all processes with target features smaller than 130 nm.

At this point, it would be sensible to assume these new resolution enhancement technologies (RET) could fill the sub-wavelength gap, as they have successfully done until now. Although certain new RET methods can in theory address these problems, they do so only for specific patterns or geometric topologies. This means that for any sub-wavelength process, there will be specific restrictions that, unless implemented, will cause the resolution to remain limited by the more traditional optical limits of numerical aperture, partial coherence and wavelength.

It is now possible to extend the classification of yield loss mechanisms by including explicitly process variations. This is necessary because a complete elimination of the systematic yield-loss components would require an absolute and perfect control of the defining process variables. Since such precise control does not exist for any real processes, all yield-loss mechanisms have in essence a random origin. However, the impact these random variations will have on the design depends on the systematic sensitivity of a given element to the type and magnitude of the process variation.

For example, imagine variations in the thickness of the resist. This variation translates into different defocus conditions between dies or wafers. Recent studies place the intrinsic process control within a wafer at about 20 nm for one standard deviation. Since processes should typically be controlled within six standard deviations, the intrinsic requirement for depth of focus (DOF) is about 240 nm.

How much a process fluctuation affects the final yield depends on the magnitude and systematic sensitivity of the design to such variation. By following a statistical process fluctuation approach, Bowman determined that the impact of these random process fluctuations could mean a loss in performance equivalent to a process generation (FIG. 4).

What Bowman's work does not consider is that the process fluctuations do not affect all features in the design equally. Thus, even if the process variation itself cannot be completely eliminated, it is possible to minimize the sensitivity to this variation by modifying the layout.

Process variations can be observed at the topological or the electrical level. The topological level refers to the shape and physical attributes of the devices, including critical dimension (CD), minimum pitch and pattern density. Depending on the topological change, the electrical behavior can be affected if the variations occur in electrically sensitive areas of the design (e.g., polysilicon gate width differences between a pair of matched transistors, or narrowing of long metal lines that subsequently increase resistance). At the same time, topological changes induced by some types of dummy fill, short interconnect paths or noncritical corners of diffusion layers will not present any observable differences in the electrical behavior of the devices.

Until now, shape-centric parameters such as fidelity (achieved by aggressive RET) and pattern robustness (achieved by manufacturing-aware design) have been primarily considered in the manufacturability of designs. However, other processing effects that are less dependent on shape or structure can also contribute to the final operation of the electronic devices. For example, even when poly gate widths are perfectly matched and robustly built, processing steps such as ion implantation, diffusion or material selection can make an otherwise correct design fail.

With the former paragraph in mind, the present invention applies relevant DFM principles to the topological or shape aspects of manufacturing. The description set forth below does not include the material science or electrical characterization aspects necessary for a complete description of the manufacture of integrated circuits. Instead, it quantifies some electrical variables that shape and topology have on the electrical behavior of devices.

While the present invention is primarily directed to shape-related effects, it will be appreciated that the invention can be extended to non-shape-related effects (such as lack of adequate processing materials or quantum tunneling).

1.2 Toward an IC-DFM Methodology

At present, there are widely known DFM principles, many of which are directly applicable to IC manufacturing, as described by D. M. Anderson (2004):
  Understand manufacturing problems: Issues of current/past products.
  Design for easy fabrication, processing, and assembly.
  Adhere to specific process design guidelines.
  Minimize tooling complexity by concurrently designing tooling.
  Specify optimal tolerances for a Robust Design.
  Understand tolerance step functions and specify tolerances wisely.

DFM concepts have already been demonstrated in other manufacturing fields (e.g., automotive and consumer products) and provide clear competitive advantages applicable to any manufacturing business.
  Product design establishes the feature set, how well the features work, hence the marketability of the product.
  The product development process determines how quickly a new product can be introduced into the marketplace.
  The product design determines how easily the product is manufactured and how easy it will be to introduce manufacturing improvements.

The value associated with these concepts has propelled a strong interest in the semiconductor industry. Unfortunately, while there is no shortage of ideas about the objective of DFM, there is no general agreement on the specifics. In other words, there is agreement on the outcome of DFM, but there is no consensus on how to achieve it. Considering all the requirements expressed by many authors, perhaps Liebmann has laid out the best general requirements of a successful DFM system:
  Improve manufacturability at extremely aggressive patterning resolution: A layout that does not rely on tight control of 2-d detail will function even within the limitations of two-beam imaging lithography.
  Ensure migrateablility of designs into future technology nodes: The resource and time investment in a new layout make it necessary to use a given chip design for multiple technology generations with minimal redesign effort.
  Allow for density- and performance-competitive chip designs: Constraints that optimize lithography but erase any benefit of moving to the next technology node do not make sense.
  Address a broad spectrum of customer objectives with a single design and process solution: To leverage the cost of mask and wafer manufacturing, different customers' needs have to be addressed with a common process solution.

Before proposing and presenting existing new approaches to DFM, it is important to know about existing IC-design flows. These are extremely varied and evolving constantly. FIG. 5 depicts a typical IC design flow in very general terms by grouping the design and production activities into three main categories: logic, virtual product and physical product.

This organization is based on the evolution of the product, which means that during the logic design, the objective is to capture the functional requirements established by the product concept. At this point the product has incorporated very little information about its final implementation and remains at a conceptual or architectural stage. As the different operations progress, the product starts to take a virtual form in which macros, cells and libraries are first generated. More information is needed about the final implementation of the product, and continuing verification steps are needed.

The first step involves a layout vs. schematic (LVS, also known as layout vs. source) check in which primarily connectivity and consistency between the logic and the physical objects is compared. A second verification, commonly known as Design Rule Check (DRC), is used mainly to address pattern transfer and pattern integration issues during manufacturing. Finally, an Electrical Rule Check (ERC) evaluates the electrical behavior of devices in the context of the product by performing a thorough characterization of the process. Especially important are effects such as resistance, capacitance and inductance, which are specific to the final topology and material selection.

The product remains in a virtual state while transferred from the design teams to the fabrication facilities (Fab). After the information arrives at the Fab, it is checked again for pattern transfer-related issues. Mask synthesis operations are used to further modify the layout to make it more manufacturable by using Resolution Enhancement Technologies (RET), fill for CMP planarization and data fracturing for mask production. The mask synthesis should be done for each level in the virtual product.

When there are no further modifications to the virtual product, actual manufacturing can proceed. It is at this point that the product takes its final physical form, so it can be inspected, tested, sorted and packaged for distribution. It is also at this stage that the process groups can learn about the problematic topologies or configurations that present a challenge for manufacture, and learn more about the actual performance of the materials being used. Newly acquired data is gathered, and ERC and DRC rules are constantly updated to represent the present state of the process.

As of today, multiple companies have tools to efficiently perform a typical design flow. In 1999, Weiler and Schellenberg expressed the need to integrate existing design and manufacturing tools into a single flow that could provide the basis for a DFM system, but five years later little has been done in the realm of DFM.

The main impediments to a more general adoption of DFM in the IC industry were the advent and subsequent success of RET. RET operations started to gain momentum in 1999 and were widely used, allowing the other parts of the current infrastructure to remain almost unaltered. Only the mask synthesis operation had to undergo a fundamental transformation. Although prior to sub-wavelength, simple Boolean operations, rotations and fracturing were required to manufacture a successful mask, a complete series of more radical modifications was necessary to guarantee an adequate pattern fidelity. The success of RET and the difficulty of achieving continuous and seamless communication between production and design teams have encouraged IC and EDA companies to focus their resources on RET activities while accomplishing little in the area of more general approaches to DFM. When performed properly, DFM refers to the action of making modifications to the "target" layout; by contrast, RET makes modifications to the layout so that it can meet the given "target".

Now that the relative effectiveness of RET is diminishing with each successive process node, true DFM activities need to be studied and evaluated. The hardware used for production is reaching its resolution limits, and layout sensitivities to process variations account for a large (although not yet well defined) contribution to yield loss.

One of the challenges for a successful implementation of DFM is the lack of a framework to guide it. The large number of experiments needed to quantify the manufacturability of a design, by using simple extensions to traditional verification and correction methods, makes such approach impractical. The point of having a framework is to provide a predefined set of guidelines for integrating the available knowledge into a consistent and compact formulation that can be used to compensate for manufacturing variations. This means that the framework has to provide a mechanism to detect and rank manufacturability problems in a design, and also to guide the correction process. In addition, such a framework should alter the existing design flow as little as possible to qualify for widespread adoption, which is one of the main reasons RET has become ubiquitous.

At present, there are groups who believe that it will be possible to improve process corner modeling of devices by massive electrical characterizations, thus achieving a more robust design at logic synthesis. Although these methods have clear applications in interconnect delays and timing closure, they fail to provide information about forbidden topologies that cannot be characterized adequately due to their high sensitivity to process variations. By approaching DFM from the standpoint of pattern robustness, and by making the layout less sensitive to process variations, these methods can be relevant when trying to explain the material aspects and electrical behavior of devices without having to explain pattern transfer effects that cannot be captured effectively in traditional electrical models. For this reason, such approaches are considered complementary to this pattern transfer-centric proposal for DFM rather than competing.

The following sections evaluate the advantages and challenges for each of the leading prior art techniques being explored to improve pattern manufacturability. Although many of these techniques are currently being evaluated for post-RET verification, in principle they could be used within a design environment to allow the designer to dictate the topology changes required to make the design more manufacturable.

1.2.1 Critical Area Analysis

Critical area analysis has traditionally been the workhorse for yield prediction in the semiconductor industry. Such methods continue to be an open area of investigation. In 2004, Asami and co-authors presented a methodology on how critical area can be used successfully to predict yield loss for an 180 nm process under a wide variety of product conditions.

Critical area ($A_c$) is a function defined for a particle defect size of equivalent radius (r), as Equation 1 suggests:

$$F(R) = \sum_{layers} \sum_{r=0}^{R} P_d(r) \cdot A_c(r) \tag{1}$$

Critical area along a defect density function typically defines a failure factor F(R), which as expected depends on the equivalent radius of defect particle size. The continued success of critical area methods is based on the extension of the "particle" concept to formulate failure rates originated by random defects independent of their physical origin. These formulae are constantly being used to explain non-particle (as in "non-physical particle", such as dust) failure mechanisms (e.g., resist collapse, resist bridging or pinching and metal stress). The use of critical area formulae is possible when clear failure mechanisms and their respective failure rates can be clearly characterized by continuous sampling during manufacturing.

However, critical area analysis has two main drawbacks. It is incapable of early yield assessment for new processes, and it lacks the mathematical machinery to incorporate more complex process effects. Although critical area can, on average, provide a good estimate of the expected yield of a product, the analysis can be performed only after enough data has been gathered during manufacturing. Critical area alone cannot predict the yield of an IC product before going into a new process. Only by using massive amounts of historical information can this method predict expected yields.

The second limitation results from the use of empirical models, which depend on short-range effects. For supra-wavelength processes, it is possible to use only space and width measurements to define critical area. As the resolution of the systems approaches the domain of deep sub-wavelength (below ½ wavelength), however, larger regions of layout context are needed to adequately capture high-sensitivity regions.

As does any technique, critical area analysis also has advantages. It is attractive and is expected to remain so, since it depends on geometrical rules (which make it fast to calculate) and a large body of experimental information (which makes it an accurate predictor when enough data is available).

1.2.2 Contrast Improvement

Because lithography is one of the most critical drivers for systematic yield loss due to the sub-wavelength gap (FIG. 2A), and image contrast has long been used as a criterion for image robustness it is not surprising that many DFM groups have tried to use contrast as a metric for evaluating the robustness of a given layout.

Among the advantages of improving image contrast is the control of line-end roughness and traditional lithographic process windows (larger depth of focus and exposure latitude). However, because image contrast remains an optical quantity (albeit with known positive effects in resist- and mask-induced errors), it cannot be extended to incorporate other process effects such as etch, chemical metal polish or overlay. In addition, as FIG. 7 suggests, it is not trivial to maximize image contrast for multiple layers concurrently. The authors of this figure restricted their analysis to the polysilicon layer, and offered little explanation for the effect that such changes had on the manufacturability of other layers present in the design.

Another consideration is that an image contrast can capture only major sensitivities in the design and does not directly translate into actual CD control because most chemically amplified resists perform in a non-linear fashion. Knowing the impact or variations in CD is one of the critical challenges that analog design faces and that cannot be reliably addressed with this method.

Based on this discussion, we can identify immediately the range of applications for these methods: primarily digital design and single-layer applications. This is one of the fastest model-based methods, since might require single optical simulations to produce a good estimate of the image quality across process window conditions. This is a very desirable characteristic of any model-based DFM method, as will be highlighted later in this work.

1.2.3 Mask Error Enhancement Factor (MEEF) Reduction

One of the first metrics that relies on sensitivity of the layout is MEEF (Mask Error Enhancement Factor). MEEF is defined as the change in the width of a feature ($CD_{wafer}$) with the change in the width of the feature in the mask ($CD_{mask}$), divided by the image reduction factor (M), which typically is 4×. MEEF is expressed in Equation 2.

$$MEEF = \frac{\partial(CD_{wafer})}{\partial\left(\frac{CD_{mask}}{M}\right)} \quad (2)$$

While critical area and image contrast methods rely on a single-pass calculation, MEEF is a perturbation quantity. To be adequately calculated, the features on the mask need to be biased prior to measuring the induced CD on the wafer in order to make it possible to obtain the corresponding MEEF value. Even with this apparent limitation, this metric is now proposed for use as a post-RET verification.

MEEF is well suited for post-RET verification because the RET objective is to bring all features as close as possible to the target layout. But there is an assumption that the mask can be perfectly manufactured. By using MEEF as an additional metric, it is possible to highlight locations in the mask that will be more susceptible to CD error induced by imperfect masks.

Although this metric incorporates a relative measure of a process-induced CD variation (the process of making the mask), it also remains primarily optical in nature. In addition, MEEF remains a fairly one-dimensional metric because CD is not well defined in corners and in low-aspect-ratio features in general. Especially for sub-wavelength features, in which high-frequency objects (such as corners or dense structures) are not well captured by the optical system and other pattern transfer effects start to become important, it is necessary to adopt a more general definition for CD variation and control. It is also interesting to note that, aside from critical area analysis, all the present proposals for a pattern transfer DFM system have been developed by RET and lithography groups trying, in one way or another, to detect the locations most likely to fail in a layer.

1.2.4 Critical Failure Optical Rule Check (CFORC)

A recent methodology to detect probable failure points in the layout also depends on optical image quantities. This technique, called Critical Failure Optical Rule Check (CFORC) maps out the failure and non-failure regions across the process window. FIG. 9 shows a process envelope (or boundary) separating process regions that will print reliably from those that will not.

This failure model is calibrated by empirical binary data in which a feature either does or does not print. This is different from traditional process model calibrations, in which many CD values are captured for any given feature, and locations that cannot be measured reliably are removed during calibration.

This model relies on an empirical mapping between image parameters (such as minimum and maximum intensities and a two dimensional image parameter, shown as Factor in FIG. 9) and the printability or non-printability of the layout. Therefore, it offers the advantage that a single optical simulation is able to detect regions most likely to fail across process window conditions. However, the speed of the calculation is improved by trading a physical for an empirical model that lacks predictive power outside the domain used for calibration, making this method very sensitive to process space sampling resulting from the test features included for calibration.

1.2.5 Restrictive Design Rules (RDR)

Although all the previous techniques can detect and highlight regions in the layout that will most likely create problems during manufacturing, they do not directly address or forbid specific layout topologies. One approach widely supported by lithography groups is the use of restricted design rules (RDR). This approach is guided by the general principle that homogenous structures with well defined frequencies can be manufactured more easily than objects that are highly bi-dimensional.

Liebmann (2003) establishes the following principles for a more manufacturable layout: Limited number of narrow line widths . . . .

Single orientation of narrow features . . . .
Narrow features placed on uniform and coarse pitch . . . .
Uniform proximity environment for all critical gates . . . .
Limited number of pitches for critical gates.

Traditionally, designers do not receive such restrictive rules well because they appear to require much larger design areas. Since area, timing and power are the three main quantities for which designers are responsible, having restricted design rules affecting any of these three criteria results in an unwelcoming response. However, a multitude of investigations suggests that the area penalty incurred by aggressive design rules is not as large as expected when the designer and the lithography groups work together toward a solution that includes pattern transfer manufacturability as a new target metric.

Unfortunately, the use of restrictive design rules has not been adopted widely because there is no systematic method in which the layout can be analyzed and ranked according to manufacturability. All other design objectives have clear procedures and figures of merit: timing (maximum clock frequency, which defines the performance of the devices), power (wattage, which with mobile applications improves battery life) and area (square microns that translate into more product per wafer, thus reducing price). But until now, there has been no metric that relates early enough in the process to product yield or reliability.

In addition, although most RDR guidelines are adequate in general, they still require the layout designer to have a good understanding of the process being used for manufacture, or at the very least a strong interaction between the layout designer and RET experts who are able to determine what a "uniform proximity environment" really means.

As is apparent by now, different groups along the IC production chain use various approaches for improving their methods to better and more economically produce aggressive designs. The objective of this framework is to build on the strengths and bypass the weaknesses inherent in all current pattern transfer DFM proposals. While many of the individual building blocks used in this proposal already exist, it is the integration of these tools into a formal and logical pattern transfer DFM framework that is lacking.

The following sections describe one embodiment of the present invention and test the details of its implementation to achieve designs less sensitive to process variations. Although the primary objective of the present invention is the development of more robust layouts, the invention can also be used to evaluate the impact that more robust structures have on the electrical behavior of the devices.

2. An IC-DFM Framework

In one embodiment, the present invention is implemented as a software framework for the verification of IC layouts to insure that they are "LFD-Clean". This framework can be applied more generally to any layout verification method that considers manufacturability criteria in the evaluation of the layout, and is not restricted to only manufacturability problems that occur during lithography.

This software framework comprises three components:
Objects: Elements that capture design intent and process conditions.
Operators: Operations that can be performed on the objects selecting or extracting quantitative information.
Guidelines: Recommendations for integrating the objects and operators consistently.

Each of these described in more detail below. As with any new technique, this DFM method is open to extensions and enhancements as more information about the interactions between process and design are identified. To maintain its consistency and usefulness, however, only elements that fall into one of the three previously defined categories may be desirable.

The present invention operates on the assumption that fast manufacturing models are available. Although pattern transfer depends on the interaction of lithography, etch and planarization, the invention uses compact lithography models to illustrate the proposed methodology. The reasoning is that fast process window lithography models have been previously calibrated and shown to reproduce lithography effects with an accuracy level comparable to that of experimental metrology.

Although only lithography effects are explored in the following pages, it will be appreciated that as new process models are made available for other pattern transfer effects, such as CMP or metallization, they can be incorporated into the framework described herewith. This can be achieved because the manufacturability object described in the following section is a variability response to a process variable. The nature of the process variation is relevant only with respect to the actual calculation of the manufacturability object. The number and type of process variations affect the framework only by requiring additional computing time during the calculation of the manufacturability object. The analysis methods described by the framework remain constant and applicable.

2.1 Manufacturability Objects: Layout and PV-Bands

Any DFM methodology will incorporate design and manufacturing components. In this case, the design object is the physical layout still residing within the design environment. This condition is desired for two reasons: the final layout is the only object that has enough information about the intended topology, and any correction to the layout topology should be re-evaluated electrically. Otherwise, it might be possible to achieve a highly manufacturable grid structure with zero functional contribution.

For the manufacturing object, this work introduces the concept of process variability bands (PV-bands). A PV-band is defined as the physical representation of the layout sensitivity to process variations. Regions within the PV-Bands will be positions where the final edge is likely to occur during manufacturing, while the regions outside the bands are positions where the edge is unlikely to occur. The typical representation for a PV-Band will be in the same medium as the representation of the layout itself: as one or more data layers in a layout encapsulation format such as GDS-II or OASIS™. One way to calculate a PV-band is to compute the pattern transfer image at multiple process conditions, and then perform a series of Boolean operations that extract the maximum and minimum edge displacement using certain probability criteria, as indicated in FIG. 11.

It is clear that an intelligent sampling method of all possible process conditions should be considered, as well as an adequate description of the processes under study (for example, the choice of RET in lithography, or the statistical variation in etch biases due to wafer processing).

As FIG. 12 suggests, the PV-band is an uncertainty region between areas that will always print and areas that will never print, thus providing a mechanism to assess the likelihood of a particular topology transfer. In other words, the smaller the PV-band, the higher the probability of correct pattern transfer. Although FIG. 12 shows energy dose and image defocus (typical lithographic process control variables), any process variation can be incorporated because it will introduce its own printability signature as long as a well calibrated, physical model is available.

These simple objects have intrinsic properties that provide the basis of this framework. The PV-bands can be made small in one of the following ways: very good process control, a more advanced process or a more robust design. In addition, PV-bands can be calculated for any layer or process and, when combined, account for inter-layer variations. For example, when the landing pad and contact variability bands overlap, the likelihood of an improper connection increases; when polysilicon and diffusion layer variability bands overlap, the likelihood of a short circuit increases. The ability to evaluate the interaction of PV-Bands for different layers and synthesize another PV-band that incorporates information from this interaction represents an especially valuable embodiment of the invention.

Each effect can be weighed according to its importance. A variability that produces a short or bridge should account for a larger contribution than the same variability in another region that does not cause a fatal defect. And because these highly process-sensitive regions are local in nature, they provide intra-die variation information.

Because process variability can be reduced over time, the same formulation can be used for processes under development (when the uncertainty is higher) and for mature processes (when the uncertainty is well controlled but not completely eliminated), thus providing a consistent evolution path. Although all these are qualitative benefits of using a PV-band formulation, the framework also provides a mechanism for ranking designs and manufacture processes in a quantitative way.

For certain design checks it is also important to determine the total pattern transfer variation with respect to the drawn layout. As FIG. 13 indicates the actual PV-band is solely defined by process variations. In contrast, an absolute PV-band should completely enclose design layers by biasing the internal or external PV-band edges until they are coincident to the target layout.

The main application of an absolute PV-band is to measure the departure of the pattern transfer with respect to the intended layout. For the rest of the discussion PV-bands refer to actual PV-bands, unless otherwise noticed.

Another novelty of this approach is that sensitivities are calculated across multiple layers because the manufacturability of the design depends on the interaction of the PV-bands. A composite map can be created to account for all the manufacturability sensitivities and highlight regions that have worse or better pattern robustness for a certain process, as indicated in FIG. 14. The information contained in the PV-bands can be efficiently displayed and processed during design, thanks to advances in layout data representation/compression.

2.2 Operators

Operators are software structures that act on the objects. Some of the more commonly used operators are widely used during layout creation (e.g., Boolean OR, AND and NOT) and may be common to other software products that operate on GDS-II or OASIS™ data, while others depend on the PV-band object itself (e.g., E2I, E2E and I2I). Table 1 lists and describes several representative operators.

TABLE 1

DESCRIPTION OF FRAMEWORK OPERATORS

| Operator | Description |
| --- | --- |
| PVBAND(Layer) | Calculates the process variability band of Layer and creates a pvBand object. |
| E2I(pvBand$_i$, pvBand$_j$) | Measures the distance between the external pvBand$_i$ edge and the internal pvBand$_j$ edge and creates a marker layer that completely encloses the selected region. |
| E2E(pvBand$_i$, pvBand$_j$) | Measures the distance between the external pvBand$_i$ edge and the external pvBand$_j$ edge and creates a marker layer that completely encloses the selected region. |
| I2I(pvBand$_i$, pvBand$_j$) | Measures the distance between the internal pvBand$_i$ edge and the internal pvBand$_j$ edge and creates a marker layer that completely encloses the selected region. |
| OR(Object$_i$ ... Object$_j$) | Boolean operation that adds all the contents of Object$_i$ through Object$_j$ to create a derived layer. Object can be an original or derived Layer or pvBand. |
| AND(Object$_i$ ... Object$_j$) | Boolean operation that adds the common contents of Object$_i$ through Object$_j$ to create a derived layer. Object can be an original or derived Layer or pvBand. |
| NOT(Object$_i$, Object$_j$) | Boolean operation that discounts the common contents of Object$_i$ and Object$_j$ from Object$_i$ to create a derived layer. Object can be an original or derived Layer or pvBand. |
| AREA(Object) | Calculates the area of the Object. Object can be an original or derived Layer or pvBand. |

As with any embodiment of logical interactions, a wide variety of programming languages can be used to create these Operators. They can be written within the structures of common DRC tools, in a language such as SVRF by Mentor Graphics; they can be written as scripts using a common scripting language such as Tcl/tk; they can be written directly as coded instructions in a computer language to be compiled such as C, C++, or FORTRAN, or they can be created as dedicated microcode for hardware specifically designed for these layer specific operations. The only requirement is that these software structures be able to read the designated Objects and deliver a result that the user can interpret.

2.3 Guidelines

After manufacturability objects and operators are defined, the third component is series of Guidelines on integrating and using them effectively. These Guidelines may be as simple as a set of design rules, but can also be augmented to incorporate a number of manufacturability rules and behaviors in codified form. These Guidelines will generally be expressed as sets of inequalities relating various parameters of the layout and manufacturing process, and can be incorporated into any of the programming representations used for the Operators mentioned above.

FIG. 15 shows (in gray) how the new design components can be incorporated into a traditional design flow with minimal impact on existing design methodologies, thus defining the natural insertion points of this methodology within the existing IC design process. Because this method determines whether the layout is likely to fail, it should primarily be used prior to electrical simulations, as shown in FIG. 15. Only after the layout can be reliably manufactured does it make sense to proceed with its electrical analysis.

Each of the new or modified operations should comply with new requirements.

1. Layout: The layout should be large enough to address the areas of influence imposed by the process, since pattern transfer effects are highly dependent on the surrounding topology.
2. Process models: These models should reliably identify the maximum and minimum pattern responses within the process variations. In the absence of a single model that can explain all process variations, they should limit prediction to specific and well defined effects. In this way, a composite PV-band can be used to identify regions that present maximum variability across many process effects and retain information on the largest contributor to the pattern variation.

3. Process-based design rules: These rules define the design violations and help to identify regions that are most sensitive. The results are used to flag regions of maximum variability and extract a quantitative metric to manufacturability.
4. PV-band calculation: This calculation uses the process models in conjunction with the process-based design rules.
5. Layout ranking: Before proceeding with electrical simulations, this layout-ranking metric serves as a design manufacturability target. Even when the process-based design rules do not return errors, it is possible to look at a continuous metric that provides additional opportunities for improvement.
6. Correction (inside the design environment): The correction resides in the design environment and requires a different interpretation of the results provided by the process-based design rules. While typical design-rule violations can be fixed by topological changes (e.g., compacting features) or morphological changes (e.g., clipping corners), these rules will generally require a topological change.

2.3.1 Manufacturing Rule Checks

RDR makes a design more manufacturable by aggressively restricting the types of topologies allowed in a design but it relies heavily on past experience and on the assumption of the existence of a geometric representation of the restricted rule. One possible way to enhance RDR is by using process-based design rules which are derived from the actual simulation of the layout.

This method derives process-based design rules from PV-bands rather than from nominal distortions and shape analysis. A pattern manufacturability rule is constructed by performing Boolean and spacing checks of the PV-bands. In this fashion, a typical set of design rules can be translated into new design rules based on PV-bands.

FIG. 16 shows a simple example of target geometry (left) and a schematic representation of the PV-bands (right) for three layers: poly, active and contact. For a perfectly modeled process, the rules can be as simple as identifying the respective PV-band overlaps. However, a more general description specifies rule tolerances that serve as an additional safety margin or depend on electrical rules.

The rules depicted in FIG. 16 can now be formally expressed as a collection of equations that use the previously defined operators and objects, and each of the traditional pattern-related design rules can be tied to its original intention. Not all design rules are included in this formulation. For example, all the electrical design rules are not incorporated because they depend on the material aspects of manufacture.

$$aoc_{Violation} = OR(AND((pvBand(\text{contact}), pvBand(\text{active}))), \quad (3)$$
$$E2I(pvBand(\text{contact}), pvBand(\text{active})) \leq aoc_{min})$$

$$cw_{Violation} = \quad (4)$$
$$OR(AND(pvBand(\text{contact})), I2I(pvBand(\text{contact})) \leq cw_{min})$$

$$gcs_{Violation} = OR(AND((pvBand(\text{poly}), pvBand(\text{contact}))), \quad (5)$$
$$E2E(pvBand(\text{poly}), pvBand(\text{contact})) \leq gcs_{min})$$

$$goa_{Violation} = OR(AND((pvBand(\text{poly}), pvBand(\text{contact})), endCap), \quad (6)$$
$$E2I(pvBand(\text{active}), pvBand(\text{poly})) \leq goa_{min})$$

$$gw_{Violation} = OR(AND(pvBand(\text{poly})), I2I(pvBand(\text{poly})) \leq gw_{min}) \quad (7)$$

$$pas_{Violation} = OR(AND((pvBand(\text{active}), pvBand(\text{poly}))), \quad (8)$$
$$E2E(pvBand(\text{active}), pvBand(\text{poly})) \leq pas_{min})$$

$$poc_{Violation} = OR(AND((pvBand(\text{contact}), pvBand(\text{poly}))), \quad (9)$$
$$E2I(pvBand(\text{contact}), pvBand(\text{poly})) \leq poc_{min})$$

2.3.1.1 Critical Area Identification: Intra Layer

The AND operator can be applied to single layers since each of the PV-bands are generated per edge. The AND operation can also serve as an explicit PV-band overlap detection. This simplifies the rule writing and avoids the unnecessary definition of positive or negative distances. The second part of the equations relates to user-defined margins that are used to incorporate limitations of the process model, or electrically-justified design rules.

2.3.1.2 Critical Area Identification: Inter Layer

By using the operators described in Table 1, it is possible to identify a particular type of failure mechanism. This is the case of the goa design rule (Equation 6), in which an endCap failure is detected by the overlap of polysilicon (poly) and active PV-bands as depicted in FIG. 18.

The support region includes the drawn line-end, plus the area defined by the boundaries of the external edges of the polysilicon PV-band. While support regions are useful in single layer, they are more important for most inter layer design rules.

One of the advantages of using models to detect critical regions is highlighted with the following example. When line-ends fail (FIG. 18A) due to PV-band overlap, a typical correction extends the line-end (FIG. 18B). But as FIG. 19 suggests, there might be other configurations in which a line-end extension is not required (FIG. 19A), and forcing such extension can result into another type of violation such as a polysilicon bridge (FIG. 19B).

2.3.2 System Ranking: Manufacturability Indices

Although manufacturing checks are useful for highlighting regions prone to failure in the layout, thus far there is no mechanism to assess the viability of the layout from the manufacturing point of view.

Introducing manufacturability indices, by defining a process variability index and a design variability index, solves the problem that results when two layouts with clean design rules return different pattern manufacturability behavior.

The process variability index (PVI) is related to the average difficulty of image transfer for a given design. The design variability index (DVI) is related to the number of locations in a layout that are sensitive to a given process. These can also be referred to as the process manufacturability index (PMI) and the design manufacturability index (DMI).

By definition, PVI is a global metric and does not provide specific information about the failure locations in the design. However, this apparent shortcoming makes it ideal for qualifying the process capabilities or the global behavior of a complete layer. In its simplest form, the PVI can be expressed as follows:

$$PVI = \sum_{layer} \frac{AREA(pvBand(\text{layer}))}{AREA(\text{layer})} + \quad (10)$$
$$\sum_{layer_i, layer_j} \frac{AREA(AND(pvBand(\text{layer}_i), pvBand(\text{layer}_j)))}{AREA(AND(\text{layer}_i, \text{layer}_j))}$$

In addition, we can define DVI that primarily serve to highlight the regions most likely to fail in the design. The desirable number in this case is zero.

$$DVI = \sum \frac{\text{AREA}(DesignRule\ \text{Violations})}{\text{AREA}(SupportLayer)} \qquad (11)$$

In Equation 11, design rule violations result from the manufacturing checks, and the support layer is used to normalize the errors with respect to the area of interest.

The design rule violation concept can be enhanced by including only defects that occur in non-redundant regions of the design. For the present discussion, however, the formulation is limited to non-redundant logic.

Immediately we can identify four conditions:

Regime I. Desirable: The process is stable and the design is manufacturable

PVI → 0
DVI = 0
Regime II. Design limited: The process is stable and the design is not manufacturable PVI → 0
DVI > 0
Regime III. Process limited: The process is unstable but the design is manufacturable PVI ≫ 0
DVI = 0
Regime IV. Undesirable: The process is unstable and the design is not manufacturable

PVI ≫ 0
DVI > 0

DVI can have a value of zero because it depends on user-definable tolerances and it is in a discontinuous function. However, PVI is a continuous function that has a fundamental limit ($PVI_{min}$). Therefore, a more realistic definition of the manufacturability regimes is as follows:

Regime I. Desirable: The process is stable and the design is manufacturable

PVI → $PVI_{min}$
DVI = 0
Regime II. Design limited: The process is stable and the design is not manufacturable PVI → $PVI_{min}$
DVI > 0
Regime III. Process limited: The process is unstable but the design is manufacturable PVI ≫ $PVI_{min}$
DVI = 0
Regime IV. Undesirable: The process is unstable and the design is not manufacturable PVI ≫ $PVI_{min}$
DVI > 0

Both indices are process specific; they depend on the number of design rules used as well as the existing process margins. However, after the definition of the indices and their arguments is fixed, the indices have the potential to permit a quantitative comparison between evolving processes and design styles.

2.3.3 Areas of Influence: Necessary Design Domain

As new processes push toward smaller and denser features, the areas that can be pre-corrected are geometrically shrinking. For that reason, the simulation area should be commensurate with the target technology and process effect.

Layout creation is classified in two categories. The first is custom layout, typically used for microprocessor, memory cell and FPGA design. The second and most common category is based on automated layout generation that uses library-driven digital place and route, in which pre-existing cells (functionality units) are placed and routed to compose the desired electrical system.

Because the placement-independent area of standard cells is disappearing (as FIG. 20 indicates), larger blocks are analyzed to adequately capture the sensitivities of the design. This is one of the main challenges facing library-driven digital place and route; traditionally, place and route tools have dealt only with cell placement impacted by routing and consequent timing closure effects.

This suggests that IP providers will have to verify their libraries are laid out in a way that is not subject to strong process sensitivities during any of the pattern transfer processes such as lithography, etch or planarization. Otherwise, the same library elements run the risk of performing as designed in some areas and differently in others, which complicates the verification of such electronic systems and creates unnecessary complexity.

On the other hand, custom layout applications can arbitrarily choose the area of interest and simplify the layout verification. This is possible because larger blocks are typically used in such applications, the surrounding layout context is known and no additional assumptions are necessary.

Although having accurate models for each of these processes provides the basis for further improvements in process technology, it is now perceived that blanket process corrections during mask synthesis will result in unacceptable turnaround times and extensive computing requirements (i.e., hundreds of CPUs). But it should be clear that, although such corrections are needed to achieve maximum accuracy during the pattern transfer, this framework suggests simply improving the robustness of the constituents of the final layout, which is based on the relative sensitivity of the layout to process variations.

The challenge of informing design teams which areas are adequate to undergo simulation and analysis can be minimized by the existing hierarchical composition of the layout. This means that for supra-wavelength techniques, cells remain the placement-independent building blocks.

For sub-wavelength technologies, placement-independent blocks can still be achieved, but require a larger number of devices. In other words, while the functional building blocks shrink with process technology, the real chip areas needed to analyze manufacturability will remain fairly constant. In the past, that was not the case, because the wavelengths that the exposure systems used were always ahead of (smaller than) the minimum features present in the layout.

For the foreseeable future, the main resolution parameters (i.e., numerical aperture and wavelength) will remain almost constant. Therefore, cells are no longer the manufacturability and functional objects, and the areas needed for manufacturability analysis will need to be calculated by the existing process effects involved in pattern transfer.

FIG. 21 depicts typical ranges of influence for four different mechanisms known to degrade the final pattern transfer process: chemical metal polish (CMP), flare, etch and optical proximity. Because of their range of influence, different methods have been adopted to minimize their impact. In the case of CMP, dummy metal fill is inserted to homogenize the pattern density and maintain polishing rates constant throughout the wafer.

Long- and short-range flare mechanisms are minimized by wafer edge exposure, mask blades and redesign of the exposure systems. Etch effects (also predominantly pattern-density dependent) are corrected by small feature biases during mask synthesis. And finally, optical proximity has become the main culprit of pattern degradation and is currently addressed by RET and OPC techniques.

The block boundaries (placement-dependent areas) need to be calculated at the very end by a full-chip-capable tool. By proper management of the boundaries, it is possible to reuse prior analysis data while recalculating only the placement-dependent areas. It is important to note that at every stage of a hierarchical composition, larger placement-independent areas start to populate the entirety of the design, to the point where the process is effectively carried out in parallel. This minimizes the risk of running into bottlenecks during the DFM analysis. However, the only real information that can be carried during layout construction is robustness; an accurate correction imposed by RET or dummy fill is not possible due to the placement-dependent effects previously discussed.

To stress the distinction between accurate and robust designs, the accuracy of a design can be achieved only by providing the complete and final physical representation of the design. By contrast, the robustness of the design can be achieved even with partial information about the final physical implementation by following a hierarchical design construction. In other words, design robustness is achieved by modifying the structure of the layout during the design stage, and design accuracy should and can be corrected prior to final mask manufacture.

2.3.4 Simulation Requirements

As indicated in FIG. 22A, the formulation of the DFM model should include most systematic and quantifiable sources of error during each processing step. Process development groups can use very early DFM models to select the best process for a set of technology requirements. However, design teams should only use specific DFM models after the process has been partially selected (OPC/RET recipe, initial process window and overlay margins).

This highlights an undesirable effect of DFM in which the only foreseeable opportunity for very early physical design is by designing to multiple process candidates. This is not a limitation of the present invention, but rather a limitation of the DFM concept itself: It is virtually impossible to design for manufacturability when the manufacturing process remains undefined.

Assuming DFM models are available, such models should predict the variability of any element in the design with respect to a given process margin. After this model has been defined, it can be incorporated easily by means of device recognition in traditional timing analysis processes when coupled with the corresponding test vectors, as shown in FIG. 22B.

New computing platforms have been proposed to deal with the more subtle effects in the deep sub-wavelength regime. Although accurate, these approaches cannot be used for a DFM analysis due to extensive turnaround times. Therefore, the first step is to verify that accurate compact models are available.

Because the range at which CMP operates (on the order of millimeters) is commeasurable to the overall size of the chips to be manufactured, there is no need for extensive modeling at the cell and block levels. The only recommendation is to achieve a density-homogenous pattern to minimize the impact of different polishing rates. Such a density pattern will also be achieved indirectly by improving flare and etch control, because these two effects depend mostly on pattern density.

As mentioned before, the models are semi-empirical, especially the resist and etch models. These models are typically based on image intensity quantities. The difference between single- and multiple-process condition models is that, in this case, the model for single-process conditions should be able to predict the CD at one process condition. But a process window model should be able to predict the rates at which the CD changes with respect to a given process variation. In other words, traditional models require the following:

$$\min \sum_{Locations} (CD_{simulated} - CD_{experimental}) \tag{12}$$

However, if we generically define a lithography model as follows:

$$CD = CD(P_i) \tag{13}$$

Where, $P_i$ can be any number (N) of model parameters

A lithographic process-aware model is also subject to at least two additional constraints:

$$\frac{\partial CD}{\partial Focus} = \sum_{i=1}^{N} \frac{\partial CD}{\partial P_i} \frac{\partial P_i}{\partial Focus} \tag{14}$$

$$\frac{\partial CD}{\partial Exposure_{Dose}} = \sum_{i=1}^{N} \frac{\partial CD}{\partial P_i} \frac{\partial P_i}{\partial Exposure_{Dose}} \tag{15}$$

These constraints impose further restrictions to the model, but when met they guarantee the applicability of the model for the purpose of process variability prediction.

This work uses an optical vector model and variable threshold resist model combination to explain lithographic effects. These models have a demonstrated level of accuracy when compared to experimental data (as shown in FIG. 23). With these models we can calculate the sensitivity of the design to a particular process variation, and detect failure regions by fully understanding the process signature (FIG. 9).

Although the presently described embodiment of the invention emphasizes and uses lithography models, the model requirements are applicable for any type of process, as long the accuracy of the model remains within the metrology and acceptable model error for nominal and process range conditions. What "acceptable model error" means for a particular technology remains to be defined by process integration and circuit design teams.

In general, if there are not known characteristics of the pattern transfer response to process variations, it may be necessary to calculate a "dense-grid" of process conditions as indicated in FIG. 24. But as the properties of the pattern transfer process are better understood, it is possible to arrive to more intelligent sampling schemes.

FIG. 25 indicates how the CD response to focus and exposure is almost symmetric along the nominal focus and exposure axis. These symmetries can be exploited to reduce the number of process conditions that can be evaluated. In this example, the simple grid simulation approach (FIG. 24) suggests 25 different simulations. By understanding the response of CD to defocus and dose, it is possible to remove most intermediate steps and only consider 5 (FIG. 25, left) different process conditions that will return the maximum and minimum changes of CD. In addition, by exploiting the symmetry of the process along the defocus axis it is possible to reduce the number of simulations further from 5 to 3 (FIG. 25, right). This method suggests that by exploiting the symmetry of some processes it is possible to reduce the total number of simulations needed.

Such technique can be expanded to other process variations such as mask bias by following the same simplification process. In the case of mask bias, the response across focus and dose will be similar, with the exception of an offset with respect to nominal conditions.

In general, assuming N defocus conditions, M dose conditions and L mask bias. Without exploiting any of the pattern-transfer properties would require: N*M*L simulations, and L number of layer modifications.

By understanding how CD is affected by dose, defocus and bias, the problem can in principle be reduced to 3 simulations and 2 layer modifications.

3. Robust Pattern Design

A Test Case

As an initial test to this methodology, the PVI and DVI were calculated for 130 nm and 90 nm versions of the same layout by using a 90 nm process. This was done to verify the qualitative behavior of the metrics in which a smaller CD design should be more challenging than a larger CD design. Only a subset of single-layer violations was considered:

$$pinch_{Violation} = \qquad\qquad\qquad\qquad\qquad (16)$$
$$\quad OR(AND(pvBand(layer)), I2I(pvBand(layer)) \le pinch_{min})$$

$$bridge_{Violation} = \qquad\qquad\qquad\qquad\qquad (17)$$
$$\quad OR(AND(pvBand(layer)), E2E(pvBand(layer)) \le bridge_{min})$$

Where, $$pinch_{min}=45 \text{ nm}, bridge_{min}=45 \text{ nm}$$

The support region needed to calculate DVI was the layer itself. The process variations were limited to dose and defocus lithographic effects. The dose margins were varied from +/−5% to +/−20%, and the defocus variations were modified from +/−50 nm to +/−150 nm. Polysilicon, thin-oxide, diffusion, n and p implant, metal 1, contacts and nwell were calculated, but only the results for n-implant, polysilicon and contacts are included for discussion purposes.

As expected, both the DVI (markers) and PVI (lines) are low, showing little sensitivity to process variations. On the other hand, contacts present a contrasting view. Although the DVI remains low, it is now possible to see a slight sensitivity to focus and dose margins. Because DVI is tied to local regions in the layout, it presents the opportunity to improve regions that produce most of the problem. By contrast, PVI shows the sensitivity that focus and dose variations impose on the layout, and that there is a much higher sensitivity for 90 nm contacts than for 130 nm contacts. This sudden jump in DVI (as FIG. 28 indicates) is a characteristic response of a layout close to the limits of the process. However, depending on the process margins, none, some or all the contacts fail, providing the opportunity to identify topologies that are robust to process variations and replicate them for more sensitive contact arrangements.

FIG. 29 shows the DVI and PVI for the polysilicon layer. Unlike a contact layer, in which a contact either opens or closes, this layer does not completely fail. Instead, the manufacturability is more continuous, with some regions failing while others image well.

This way of identifying regions that fail and comparing them to those that do not fail makes it possible to determine quantitatively the improvement in manufacturability after the changes have been made. At this point, it is also possible to assess changes in one layer and determine how the modifications affect other layers by calculating the complete DVI and PVI for all layers of interest. In this manner, even if manufacturability is gained in one layer, the negative effects in others can be quantified, and a more informed decision about the changes can be made.

3.1 Design Optimization

The example that follows integrates design and manufacturing information and uses the proposed framework to improve the manufacturability of a small library cell. The schematic and layout understudy are shown in FIG. 30.

This DRC clean cell was obtained initially by an automated compaction tool. The subsequent operations maintained the DRC clean condition while seeking a different, more manufacturable topology. The modifications were subject to traditional multi-layer constraints (e.g., poly landing pads were aligned with contact and metal layers). The complete truth table was tested for static functionality. The dynamic functionality was defined by 13 events that correspond to the number of times the output signal (Y) changes during the truth table test, as shown in FIG. 31.

For two reasons, a 90 nm-capable manufacturing process was used to simulate the 130 nm cells. First, it tested the sensitivity of the design optimization method since a 90 nm process should have no problems in manufacturing 130 nm designs rules. The second reason was that complete SPICE models were lacking. Because of their tabular nature, using a 90 nm process model provided access to smaller feature sizes relative to the 130 nm nominal features.

The simulations for each process condition used existing parasitic and SPICE models. To simulate timing, the 130 nm cells were modeled by using an existing 90 nm process. In this way, the SPICE model tables were able to interpolate the smaller geometries from the process-induced topological changes.

After a series of manual corrections driven by the optimization of DVI and PVI, the most manufacturable equivalent cell is depicted in FIG. 32. These manual corrections in this example comprised arranging elements such as contact holes into as much of a regular array as possible, making the gates and other elements of the poly layer to be as close to a regular grid as possible, restructuring the landing pads for the contacts to have more symmetric topologies, and, when possible, larger areas. Other similar operations will be apparent to those skilled in the art when they encounter other layouts or cells for optimization Notice how the cell implementations (FIG. 30 versus FIG. 32) differ in topological aspects; the optimized cell takes on a more manufacturable grid-like aspect as proposed by RDR. The area of the original and the optimized cells is the same, and both operate as designed at nominal conditions. However, a stricter comparison involves the cell characterization at other processing conditions.

The DVI and the PVI were calculated at +/−5, 10, 15 and 20% dose control and +/−50, 100, 150, 200 and 250 nm defocus control. Due to the definition of DVI and PVI, a smaller value is desirable; indicating that the pattern transfer variability is small with respect to the area of relevance. This effectively converts the layout optimization problem to a cost-function minimization problem and introduces the possibility for automatic corrections. An automatic correction method seems within reach by combining existing compaction methods with the directionality provided by the PV-bands. For this work, however, the correction method was performed manually by using a layout editor and a PV-band calculator environment.

FIG. 33A shows how contacts drastically fail (i.e., isolated contacts do not open and dense contacts merge) at the larger defocus conditions (+/−200 and +/−250 nm) and more extreme dose margins (+/−15 and +/−20%), but it also indicates that there are a few errors at even tighter process control. By contrast, FIG. 33B shows large failures at the largest process margins, but high process insensitivity at any other process condition. One of the main problems with making a layer insensitive is that improving the manufacturability of one layer can adversely affect another.

To assess this concern, FIG. 34 shows the results for the polysilicon layer and how improvements can also be made to this layer, although the improvements are much less dramatic (notice the different DVI scale).

n and p implant, oxide and diffusion layers remained constant; therefore, there is no difference between the PVI and DVI. These layers were not optimized because they did not exhibit any failure points within the process margins of interest, and they did not have to be modified to accommodate any changes imposed to the poly, contact and metal 1 levels.

FIG. 35 shows the original and the optimized 130 nm cell with a direct shrink to 90 nm. At 130 nm the contacts started to fail only at the largest process margins; at 90 nm the sensitivity to process variations is much more evident. The previously calculated optimal contact layer, now shrunk by a factor of 70%, is only slightly better than the original counterpart, which is shrunk by the same rate.

This data highlights one potential side effect of DFM: optimal topologies can be tied to a particular process technology in a way that makes it difficult to generate a solution that returns maximum manufacturability for a group of available processes.

In principle, this limitation can be addressed by considering the bounds of multiple processes instead of one. This, of course, adds to the computational requirements, but it is feasible. The downside is that, unlike a solution targeted for a specific process, this solution can be suboptimal for the final process. This is when the availability of a manufacturability index helps guide the design tradeoffs by quantitatively measuring how much more manufacturable a design would be for any given processes.

3.2 Pattern Robustness Analysis: Critical Dimension Stability

Pattern robustness is typically assessed by focus-exposure data in which a given feature is being sampled. FIG. 36 shows feature changes that affect gate length for the original (org) and the optimized (opt) cell.

Under the worst process margins (+/−250 nm defocus and +/−20% dose change), the total CD range for the original cell is about 63 nm, and for the optimized cell is 53 nm. This is how lithographers typically report feature behavior with process variations.

The problem with this type of analysis is that not all features behave in the same manner. Although there are regions that can be made more robust, others regions are very sensitive to process variations. How much these feature variations affect the electrical behavior of the cells has been a popular topic of investigation that will be addressed in the following section.

3.3 Electrical Analysis: Timing Process Windows

After the manufacturability index of the region is optimized, the electrical impact can be correlated to the functional (timing) information to determine whether the manufacturability margins are adequate. Using the experimentally calibrated process window models, the effect in the timing process window can be recalculated for two different devices: one timed element and one untimed element. In this case, only the polysilicon layer was allowed to fluctuate to illustrate the method, but in principle this can be done for any number of layers. The limitation then becomes the amount of computing power needed to correctly characterize the electrical variations. For this reason, it is preferable to make the design less sensitive to process variations, or at least equivalently sensitive, so that this electrical analysis can be performed in the traditional fashion.

To assess the improvements that a more robust pattern provides to the parametric behavior of a design, the flow depicted in FIG. 37 was implemented in a program called EDOCEO. (Translated from Latin, EDOCEO means "to instruct thoroughly, to inform fully".)

The organization of the program along its major components is depicted in FIG. 38. The program consisted of interfacing existing EDA tools from Mentor Graphics using the tcl/tk scripting language. The tools used were Calibre® DRC, LVS, XRC and RET for the computation of the silicon image and extraction of the new electrical system and ELDO, for the timing simulation. The analysis and reformatting were accomplished by developing tcl/tk programs.

As an example of the results that such a program can generate, FIG. 39 and FIG. 40 correspond to two timing test vectors for different process window conditions applied to a 130 nm polysilicon layer. Only the polysilicon layer was replaced during the analysis; therefore, the contributions to timing from the "imperfection" of other layers was assumed to be zero.

As these figures show, the use of OPC is highly recommended for sub-wavelength processes. For that reason, the process characterization step should include the nature of the RET being used because it will introduce its own sensitivity signature.

Traditionally, manufacturing facilities provide five types of SPICE models: TT (nominal), FF, FS, SF and SS, referring to the fast (F) and slow (S) conditions for the n and p transistors. By the nature of their calibration, SPICE models incorporate all processing effects, including lithography, from a statistical analysis of the process corners.

The inclusion of multiple effects complicates the analysis of individual contributors. However, by explicitly calculating one manufacturing effect across all available electrical models, it is possible to determine the raw sensitivity of the design to the manufacturing effect. For simplicity, this analysis assumes that all layers are built perfectly as drawn, and only the polysilicon layer has been replaced by the real silicon image.

This is a conservative approximation of the impact that lithography has on the electrical performance of devices. The simulations are done by using all five available SPICE models in order to assess the relative contribution of lithography to the complete processing behavior.

Although the timing margins established by the non-nominal models (FF, SS, SF and FS) are able to enclose the polysilicon process variations at nominal conditions (TT), it is clear that the process-induced pattern variations contribute greatly to the total design margin.

FIG. 41 (original cell) and FIG. 42 (optimal cell) show how the optimal cell continues to function under an even a wider set of process conditions. When the cell ceases to operate, the data series are truncated, thus indicating that a fatal failure has occurred.

In addition, FIG. 43 shows event 3 under a variety of process conditions and RET treatments. Since the RET was considered during the cell optimization, it is no surprise that the optimal cell shows the smallest delay sensitivity under most of the tested process conditions.

The same analysis was performed on the original cell with and without RET. The very different behavior in the three cases suggests that, to correctly predict the electrical behavior of a layout, it may be necessary to incorporate RET and process information during the electrical simulations, particularly when trying to determine the margins of operation.

These figures show an important aspect of the proposed framework: as the process control improves, the need for more robust designs diminishes. Conversely, as the process margins worsen with respect to the target geometries (as is likely with smaller and smaller sub-wavelength processes), the need to qualify the sensitivities of the design in a consistent and standardized fashion increases. These plots also suggest the need to better account for these pattern transfer sensitivities in a more complete fashion in existing electrical models.

In practice, such timing analysis is excessive and does not provide any clear guidance for improving the design. However, employing this type of refined analysis is useful for characterizing the benefit that different design-for-manufacturing techniques provide. In addition, as FIG. 43 suggests, the proposed framework results in a direct and beneficial impact on the parametric response and does not require additional electrical simulation of the system.

4. Conclusions

A framework for pattern transfer design-for-manufacturing has been disclosed. Furthermore, there is a clear link between pattern robustness and parametric behavior. This link indicates the possibility of a unified manufacturability framework that is electrical and pattern dependent.

This framework frees the layout design team from the need to be proficient in all details of the manufacturing process. Since the models encapsulate the process being used, the output and the way the designer interacts with the process data are independent of the process itself.

Due to its generic nature, this framework can automatically yield designs that are RET aware, CMP aware or aware of any other process for which a process model becomes available.

While the preferred embodiment of the invention has been illustrated and described, it will be appreciated that various changes can be made therein without departing from the spirit and scope of the invention. For example, although the described embodiment of the invention calculates both an inner edge and an outer edge of the PV-bands, it may be desirable for some verifications only to calculate the outer PV-band edge. Design rules can analyze the PV-bands to indicate where the objects may produce a fault if printed at their largest size.

The invention claimed is:

1. A computer-implemented method of verifying an integrated circuit design, comprising:
   receiving a layout or portion thereof that defines one or more objects to be created with a photolithographic process;
   simulating, with a computer, how at least one of the one or more objects will be printed under two or more varying lithographic process conditions to produce edge displacement data for the at least one object under each of the two or more process conditions;
   combining the edge displacement data for the at least one object to generate one or more PV-bands; and
   analyzing the one or more PV-bands with one or more design rules to verify the integrated circuit design.

2. The method of claim 1, wherein each object to be created is defined as a number of polygon vertices in a layer of a layout database and wherein each PV-band is stored as a number of vertices in a layer of the layout database.

3. The method of claim 2, wherein each PV-band may include an inner edge and an outer edge, or only an outer edge, defined as a collection of vertices.

4. The method of claim 3, wherein the vertices for the inner edge and outer edge of the PV-bands are stored in separate data layers.

5. The method of claim 1, wherein the PV-bands are analyzed with a design rule that calculates one or more of the area, perimeter, or length of the PV-bands.

6. The method of claim 5, further comprising ranking two or more layouts by the area of the PV-bands to determine which layout design is more susceptible to process variations.

7. The method of claim 1 further comprising: determining an area of interest for each object and comparing the one or more PV-bands for each object to the corresponding area of interest with one or more design rules.

8. The method of claim 7, further comprising ranking two or more layout designs based on a comparison of the PV-bands or properties derived therefrom to the area of interest.

9. The method of claim 1, wherein the PV-bands are produced by calculating images of the objects with varying process conditions.

10. The method of claim 1, wherein the PV-bands are produced by convolving the objects with distribution functions of process variables.

11. The method of claim 1, further comprising creating a mask or reticle using the results of the analyzing.

12. The method of claim 1, further comprising creating an integrated circuit using a mask or reticle created using the results of the analyzing.

13. A computer readable storage device storing a number of instructions that when executed by a computer system, cause the computer system to perform a method of verifying a design represented by a layout or portion thereof that defines one or more objects to be created with a photolithographic process, the method comprising:
   simulating how at least one of the one or more objects will be printed under two or more varying lithographic process conditions to produce edge displacement data for the at least one object under each of the two or more process conditions;
   combining the edge displacement data for the at least one object to generate one or more PV-bands; and
   analyzing the one or more PV-bands with one or more design rules to verify the design.

14. A method of verifying an integrated circuit design, comprising:
   receiving, via a computer system, a layout or portion thereof that defines a number of objects to be created on a wafer with a photolithographic process;
   transmitting the layout received or portion thereof to a remote computer system that performs the acts of:
      simulating how at least one of the one or more objects will be printed on a wafer under two or more varying process conditions to produce edge displacement data for the at least one object under each of the two or more process conditions;

combining the edge displacement data for the at least one object to generate one or more PV-bands; and analyzing the one or more PV-bands with one or more design rules to verify the integrated circuit design.

15. A computer-implemented method for verifying an integrated circuit layout that defines a number of objects to be created on a wafer with a photolithographic process comprising:

receiving all or a portion of the integrated circuit layout defining one or more objects to be created on a wafer;

determining, with a computer, maximum edge displacements with which the one or more objects will be printed on a wafer under each of two or more sets of varying photolithographic process conditions;

combining the maximum edge displacements to produce a maximum combined edge displacement for at least one of the objects; and analyzing the maximum combined edge displacements of the objects with one or more design rules to verify the integrated circuit design.

16. The method of claim 15, further comprising:

determining minimum edge displacements with which the one or more objects will be printed on a wafer under each of the two or more sets of varying process conditions;

combining the minimum edge displacements to produce a minimum combined edge displacement for at least one of the objects; and analyzing the minimum combined edge displacements of the objects with one or more design rules to verify the integrated circuit design.

17. The method of claim 16, further comprising: defining for each object a PV-band having an outer edge corresponding to the maximum combined edge displacement with which the object will be printed under some process conditions and an inner edge corresponding to the minimum combined edge displacement.

18. The method of claim 17, further comprising: defining an area of interest for one or more of the objects to be created on a wafer; and comparing the PV-band for an object to the defined area of interest to verify if the object will be created correctly on the wafer.

19. The method of claim 15, further comprising creating a mask or reticle using the results of the analyzing.

20. The method of claim 15, further comprising creating an integrated circuit using a mask or reticle created using the results of the analyzing.

21. A computer-readable storage device storing a number of instructions that when executed by a computer cause the computer to perform a method of verifying an integrated circuit design represented by all or a portion of an integrated circuit layout defining one or more objects to be created on a wafer, the method comprising:

determining maximum edge displacements with which the one or more objects will be printed on a wafer under each of two or more sets of varying photolithographic process conditions;

combining the maximum edge displacements to produce a maximum combined edge displacement for at least one of the objects; and analyzing the maximum combined edge displacements of the objects with one or more design rules to verify the integrated circuit design.

22. The computer-readable storage device of claim 21, wherein the method further comprises:

determining minimum edge displacements with which the one or more objects will be printed on a wafer under each of the two or more sets of varying process conditions;

combining the minimum edge displacements to produce a minimum combined edge displacement for at least one of the objects; and analyzing the minimum combined edge displacements of the objects with one or more design rules to verify the integrated circuit design.

23. The computer-readable storage device of claim 21, wherein the method further comprises defining for each object a PV-band having an outer edge corresponding to the maximum combined edge displacement with which the object will be printed under some process conditions and an inner edge corresponding to the minimum combined edge displacement.

24. The computer-readable storage device of claim 21, wherein the method further comprises defining an area of interest for one or more of the objects to be created on a wafer; and comparing the PV-band for an object to the defined area of interest to verify if the object will be created correctly on the wafer.

25. A computer-readable storage device storing a number of instructions stored thereon that can be executed by a computer to perform the acts of:

reading data representing features of at least a portion of an integrated circuit layout;

generating one or more manufacturability objects from the data, wherein at least one of the objects is generated by combining layout sensitivity data for one or more of the features across multiple process variations;

performing operations on one or more of the objects using one or more operators; and generating analysis data using guidelines that describe relationships between one or more of the objects or between one or more of the objects and one or more of the operators.

26. The computer-readable storage device of claim 25, in which the at least one of the objects represents the layout sensitivity as a PV-band.

27. The computer-readable storage device of claim 25, in which the objects are computed using a designated process model.

28. The computer-readable storage device of claim 25, in which the operators comprise at least one or more of the following: Boolean operations, distance operations, or area operations.

29. The computer-readable storage device of claim 25, in which the guidelines comprise design rules, manufacturability rules, or design rules and manufacturability rules.

30. A system comprising:

one or more processors;

one or more computer-readable storage media storing instructions that when executed by the processors cause the system to perform a method, the method comprising:

simulating, with a computer, how one or more objects to be created with a photolithographic process will be printed under two or more varying photolithographic process conditions to produce edge displacement data for the one or more objects under each of the two or more process conditions;

combining the edge displacement data to generate one or more PV-bands; and analyzing the one or more PV-bands with one or more design rules to verify the integrated circuit design.

31. The system of claim 30, wherein each PV-band includes an inner edge and an outer edge.

32. The system of claim 30, wherein the method further comprises ranking two or more layout designs by an area of the PV-bands to determine which layout design is more susceptible to process variations.

33. The system of claim 30, wherein the method further comprises determining an area of interest for each object and comparing the one or more PV-bands for each object to the corresponding area of interest with one or more design rules.

34. A system comprising:
one or more processors;
one or more computer-readable storage media storing instructions that when executed by the processors cause the system to perform a method, the method comprising:
determining maximum edge displacements with which one or more objects will be printed on a wafer under each of two or more sets of varying photolithographic process conditions;
combining the maximum edge displacements to produce a maximum combined edge displacement for at least one of the objects; and
analyzing the maximum combined edge displacements of the objects with one or more design rules to verify the integrated circuit design.

35. The system of claim 34, wherein the method further comprises:
determining minimum edge displacements with which the one or more objects will be printed on a wafer under each of the two or more sets of varying process conditions;
combining the minimum edge displacements to produce a minimum combined edge displacement for at least one of the objects; and
analyzing the minimum combined edge displacements of the objects with one or more design rules to verify the integrated circuit design.

36. The system of claim 34, wherein the method further comprises defining for each object a PV-band having an outer edge corresponding to the maximum combined edge displacement with which the object will be printed under some process conditions and an inner edge corresponding to the minimum combined edge displacement.

37. The system of claim 34, wherein the method further comprises defining an area of interest for one or more of the objects to be created on a wafer; and comparing the PV-band for an object to the defined area of interest to verify if the object will be created correctly on the wafer.

38. A computer-implemented method of verifying an integrated circuit design, the method comprising:
generating one or more manufacturability objects from data representing features of at least a portion of an integrated circuit layout, wherein at least one of the objects is generated by combining layout sensitivity data for one or more of the features across multiple process variations;
performing operations on one or more of the objects using one or more operators; and
generating analysis data using guidelines that describe relationships between one or more of the objects or between one or more of the objects and one or more of the operators.

39. The method of claim 38, further comprising ranking two or more layout designs based on a comparison of the objects or properties derived therefrom to an area of interest for each of the objects.

\* \* \* \* \*